US010178617B2

(12) United States Patent
Splitz et al.

(10) Patent No.: US 10,178,617 B2
(45) Date of Patent: Jan. 8, 2019

(54) HAIL AND ACCEPTANCE FOR BATTERY-POWERED DEVICES

(71) Applicant: Mueller International, LLC, Atlanta, GA (US)

(72) Inventors: David Edwin Splitz, Sandwich, MA (US); Dale McLeod Magley, Norton, MA (US)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 15/583,263

(22) Filed: May 1, 2017

(65) Prior Publication Data

US 2018/0317169 A1 Nov. 1, 2018

(51) Int. Cl.
G08C 19/04 (2006.01)
H04W 52/02 (2009.01)
H04Q 9/02 (2006.01)

(52) U.S. Cl.
CPC .......... H04W 52/0216 (2013.01); H04Q 9/02 (2013.01); H04W 52/0206 (2013.01);
(Continued)

(58) Field of Classification Search
None
See application file for complete search history.

(56) References Cited

U.S. PATENT DOCUMENTS 3,672,233 A 6/1972 Hjermstad
5,371,734 A 12/1994 Fischer
(Continued)

FOREIGN PATENT DOCUMENTS

EP 2772074 8/2018
WO 2009133237 11/2009
(Continued)

OTHER PUBLICATIONS

Cullinan, Thomas; Final Office Action for U.S. Appl. No. 15/098,986, filed Apr. 14, 2016, dated Jan. 25, 2018, 22 pgs.
(Continued)

Primary Examiner — Adolf Dsouza
(74) Attorney, Agent, or Firm — Taylor English Duma LLP

(57) ABSTRACT

A method of performing a hail communication attempt includes checking capacitor voltage of a capacitor in a battery pack powering a hailing device to determine whether the capacitor voltage equals or exceeds a threshold voltage, and responsive to determining that the capacitor voltage equals or exceeds the threshold voltage, transmitting a hail (ping) message to a target device, determining whether the hailing device has received a responsive pong message from the target device, and responsive to determining that the hailing device has received a responsive pong message, terminating the hail communication attempt in preparation for sending data to the target device. Hail communication attempts are limited according to a predetermined number of consecutive groups of consecutive hail messages, with the capacitor voltage check occurring before the sending of each group. The method is compatible with target devices having different sniffing intervals, so long as those sniffing intervals have predefined relationships.

27 Claims, 11 Drawing Sheets

(52) U.S. Cl.
CPC ..... *H04Q 2209/10* (2013.01); *H04Q 2209/75* (2013.01); *H04Q 2209/883* (2013.01)

(56) References Cited

U.S. PATENT DOCUMENTS

| | | | |
|---|---|---|---|
| 5,438,329 A | 8/1995 | Gastouniotis et al. | |
| 5,594,776 A | 1/1997 | Dent | |
| 5,666,655 A | 9/1997 | Ishikawa et al. | |
| 5,774,733 A * | 6/1998 | Nolan | G06F 1/26 341/141 |
| 5,787,358 A | 7/1998 | Takahashi | |
| 5,892,441 A | 4/1999 | Woolley et al. | |
| 5,963,557 A | 10/1999 | Eng | |
| 6,028,855 A | 2/2000 | Hirsch | |
| 6,031,466 A | 2/2000 | Leshets et al. | |
| 6,405,047 B1 | 6/2002 | Moon | |
| 6,717,926 B1 | 4/2004 | Deboille et al. | |
| 6,900,737 B1 | 5/2005 | Ardalan | |
| 7,123,628 B1 | 10/2006 | Hwang | |
| 7,272,635 B1 | 9/2007 | Longtin et al. | |
| 7,313,164 B1 * | 12/2007 | Wilson | H04B 1/7075 375/141 |
| 7,346,030 B2 | 3/2008 | Cornwall | |
| 7,420,942 B2 | 9/2008 | Wang | |
| 7,564,826 B2 | 7/2009 | Sherman et al. | |
| 7,760,703 B2 | 7/2010 | Kubler et al. | |
| 7,843,379 B2 | 11/2010 | Menzer et al. | |
| 7,962,101 B2 | 6/2011 | Vaswani et al. | |
| 8,014,791 B2 | 9/2011 | Guigne et al. | |
| 8,194,636 B1 | 6/2012 | Doherty et al. | |
| 8,300,626 B2 | 10/2012 | Thubert et al. | |
| 8,375,134 B2 | 2/2013 | Herzog et al. | |
| 8,391,177 B2 | 3/2013 | Picard | |
| 8,660,134 B2 | 2/2014 | Splitz | |
| 8,855,569 B2 | 10/2014 | Splitz | |
| 8,931,337 B2 | 1/2015 | Renoud | |
| 9,179,502 B2 | 11/2015 | Fischer | |
| 9,204,341 B2 | 12/2015 | Su | |
| 9,271,231 B2 | 2/2016 | Nucci | |
| 9,408,112 B2 | 8/2016 | Su | |
| 9,565,620 B2 | 2/2017 | Dukes | |
| 9,743,458 B2 | 8/2017 | Jain et al. | |
| 9,756,089 B2 | 9/2017 | Brook | |
| 9,807,793 B2 | 10/2017 | Fischer | |
| 9,854,607 B1 | 12/2017 | Chu et al. | |
| 9,883,548 B2 | 1/2018 | Backholm et al. | |
| 9,961,694 B2 | 5/2018 | Gao et al. | |
| 10,039,018 B2 | 7/2018 | Splitz et al. | |
| 10,070,403 B2 | 9/2018 | Grady et al. | |
| 10,097,411 B2 | 10/2018 | Splitz et al. | |
| 2002/0051546 A1 | 5/2002 | Bizjak | |
| 2002/0159434 A1 | 10/2002 | Gosior et al. | |
| 2005/0078631 A1 | 4/2005 | Cornwall | |
| 2005/0190784 A1 | 9/2005 | Stine | |
| 2005/0249170 A1 | 11/2005 | Salokannel et al. | |
| 2006/0187866 A1 | 8/2006 | Werb | |
| 2006/0245440 A1 | 11/2006 | Mizukoshi | |
| 2006/0268746 A1 | 11/2006 | Wijting et al. | |
| 2006/0274673 A1 | 12/2006 | Fleury | |
| 2007/0014269 A1 | 1/2007 | Sherman et al. | |
| 2007/0057812 A1 | 3/2007 | Cornwall | |
| 2007/0091825 A1 | 4/2007 | Budampati et al. | |
| 2007/0286136 A1 | 12/2007 | Rittle et al. | |
| 2007/0293221 A1 | 12/2007 | Hwang et al. | |
| 2008/0043637 A1 | 2/2008 | Rahman | |
| 2008/0084260 A1 | 4/2008 | Swartzentruber | |
| 2008/0086560 A1 | 4/2008 | Monier et al. | |
| 2008/0240078 A1 | 10/2008 | Thubert | |
| 2009/0188313 A1 | 7/2009 | Ball | |
| 2009/0201169 A1 | 8/2009 | D'Hont et al. | |
| 2009/0268652 A1 | 10/2009 | Kneckt et al. | |
| 2009/0322453 A1 | 12/2009 | Kawaguchi | |
| 2010/0007521 A1 | 1/2010 | Cornwall | |
| 2010/0026517 A1 | 2/2010 | Cumeralto et al. | |
| 2010/0085954 A1 | 4/2010 | Keshavarzian | |
| 2010/0097988 A1 | 4/2010 | Chung | |
| 2010/0195552 A1 | 8/2010 | Ho | |
| 2010/0329232 A1 | 12/2010 | Tubb et al. | |
| 2011/0018762 A1 | 1/2011 | Walley et al. | |
| 2011/0066297 A1 | 3/2011 | Saberi | |
| 2011/0140909 A1 | 6/2011 | Olson et al. | |
| 2011/0152970 A1 | 6/2011 | Jollota | |
| 2011/0317019 A1 | 12/2011 | Bahl et al. | |
| 2012/0008536 A1 | 1/2012 | Tervahauta et al. | |
| 2012/0026007 A1 | 2/2012 | Beattie | |
| 2012/0068476 A1 | 3/2012 | Bradfield | |
| 2012/0068477 A1 | 3/2012 | Bradfield | |
| 2012/0115518 A1 | 5/2012 | Zeira | |
| 2012/0201231 A1 | 8/2012 | Omeni | |
| 2012/0305084 A1 | 12/2012 | Ball | |
| 2013/0007231 A1 | 1/2013 | Forssell | |
| 2013/0064159 A1 | 3/2013 | Edwards | |
| 2013/0083722 A1 | 4/2013 | Bhargava et al. | |
| 2013/0094537 A1 | 4/2013 | Hui et al. | |
| 2013/0107772 A1 | 5/2013 | Splitz et al. | |
| 2013/0107999 A1 | 5/2013 | Mainaud et al. | |
| 2013/0109319 A1 * | 5/2013 | Splitz | H04W 4/70 455/63.1 |
| 2013/0155925 A1 | 6/2013 | Priyantha et al. | |
| 2013/0181848 A1 | 7/2013 | Picard | |
| 2013/0214883 A1 | 8/2013 | Yano | |
| 2013/0285855 A1 | 10/2013 | Dupray | |
| 2013/0336245 A1 | 12/2013 | Fischer | |
| 2014/0120962 A1 | 5/2014 | Merlin | |
| 2014/0314003 A1 | 10/2014 | Zhou | |
| 2014/0329498 A1 | 11/2014 | Cherian et al. | |
| 2015/0003227 A1 | 1/2015 | Splitz | |
| 2015/0006633 A1 | 1/2015 | Vandwalle et al. | |
| 2015/0081814 A1 | 3/2015 | Turakhia | |
| 2015/0103818 A1 | 4/2015 | Kuhn | |
| 2015/0124698 A1 | 5/2015 | Jain et al. | |
| 2015/0257041 A1 | 9/2015 | Su | |
| 2015/0382283 A1 | 12/2015 | Wang et al. | |
| 2016/0050689 A1 | 2/2016 | Fischer | |
| 2016/0066249 A1 | 3/2016 | Dukes | |
| 2016/0080980 A1 | 3/2016 | Su | |
| 2016/0192381 A1 | 6/2016 | Gao et al. | |
| 2016/0249378 A1 | 8/2016 | Zhou | |
| 2016/0269971 A1 | 9/2016 | Kim et al. | |
| 2016/0373940 A1 | 12/2016 | Splitz | |
| 2017/0164307 A1 | 6/2017 | Zuniga et al. | |
| 2017/0265153 A1 | 9/2017 | Grady et al. | |
| 2017/0280450 A1 | 9/2017 | Jeong et al. | |
| 2017/0303103 A1 | 10/2017 | Cullinan | |
| 2017/0339016 A1 | 11/2017 | Splitz | |
| 2018/0014248 A1 | 1/2018 | Splitz | |
| 2018/0220354 A1 | 8/2018 | Heil | |
| 2018/0310265 A1 | 10/2018 | Grady et al. | |

FOREIGN PATENT DOCUMENTS

| | | |
|---|---|---|
| WO | 2013062571 | 5/2013 |
| WO | 2013062613 | 5/2013 |
| WO | 2016036475 | 3/2016 |

OTHER PUBLICATIONS

Grady, Robert Henry; Non-Final Office Action for U.S. Appl. No. 15/065,423, filed Mar. 9, 2016, dated Nov. 28, 2017, 45 pgs.

Splitz, David Edwin; Non-Final Office Action for U.S. Appl. No. 15/206,851, filed Jul. 11, 2016, dated Feb. 7, 2018, 53 pgs.

Splitz, David Edwin; International Search Report for PCT Application No. PCT/US2017/050393, filed Sep. 7, 2017, dated Jan. 8, 2018, 14 pgs.

Splitz, David Edwin; Non-Final Office Action for U.S. Appl. No. 15/161,448, filed May 23, 2016, dated Sep. 22, 2017, 32 pgs.

Splitz, David Edwin; Office Action for Canadian Patent Application No. 2,861,675, filed Oct. 28, 2011, dated Aug. 22, 2017, 4 pgs.

Splitz, David Edwin; Office Action for Canadian patent application No. 2,850,059, filed Mar. 25, 2014, dated Oct. 31, 2017, 3 pgs.

Splitz, David Edwin; Issue Notification for U.S. Appl. No. 13/283,526, filed Oct. 27, 2011, dated Feb. 5, 2014, 1 pg.

(56) References Cited

OTHER PUBLICATIONS

Splitz, David Edwin; Non-Final Office Action for U.S. Appl. No. 13/283,526, filed Oct. 27, 2011, dated Jun. 18, 2013, 67 pgs.
Splitz, David Edwin; Notice of Allowance for U.S. Appl. No. 13/283,526, filed Oct. 27, 2011, dated Oct. 9, 2013, 16 pgs.
Splitz, David Edwin; Issue Notification for U.S. Appl. No. 13/339,655, filed Dec. 29, 2011, dated Sep. 17, 2014, 1 pg.
Splitz, David Edwin; Non-Final Office Action for U.S. Appl. No. 13/339,655, filed Dec. 29, 2011, dated Mar. 5, 2014, 18 pgs.
Splitz, David Edwin; Non-Final Office Action for U.S. Appl. No. 13/339,655, filed Dec. 29, 2011, dated Sep. 16, 2013, 57 pgs.
Splitz, David Edwin; Notice of Allowance for U.S. Appl. No. 13/339,655, filed Dec. 29, 2011, dated May 23, 2014, 41 pgs.
Splitz, David Edwin; Final Office Action for U.S. Appl. No. 14/490,081, filed Sep. 18, 2014, dated Jan. 11, 2017; 23 pgs.
Splitz, David Edwin; Non-Final Office Action for U.S. Appl. No. 14/490,081, filed Sep. 18, 2014; dated Sep. 29, 2016; 34 pgs.
Dukes, Brent.; Issue Notification for U.S. Appl. No. 14/475,050, filed Sep. 2, 2014, dated Jan. 18, 2017, 1 pg.
Dukes, Brent; Non-Final Office Action for U.S. Appl. No. 14/475,050, filed Sep. 2, 2014, dated May 19, 2016, 119 pgs.
Dukes, Brent; Notice of Allowability for U.S. Appl. No. 14/475,050, filed Sep. 2, 2014, dated Nov. 21, 2016, 33 pgs.
Dukes, Brent; Notice of Allowability for U.S. Appl. No. 14/475,050, filed Sep. 2, 2014, dated Dec. 15, 2016, 6 pgs.
Dukes, Brent; Notice of Allowance for U.S. Appl. No. 14/475,050, filed Sep. 2, 2014, dated Oct. 21, 2016, 15 pgs.
Cullinan, Thomas; Non-Final Office Action for U.S. Appl. No. 15/098,986, filed Apr. 14, 2016; dated Jul. 12, 2017; 23 pgs.
Splitz, David; International Preliminary Report on Patentability for Serial No. PCT/US11/58260, filed Oct. 28, 2011, dated May 8, 2014, 7 pgs.
Splitz, David; International Search Report and Written Opinion for Serial No. PCT/US11/58260, filed Oct. 28, 2011, dated Feb. 7, 2012, 8 pgs.
Splitz, David; International Preliminary Report on Patentability for Serial No. PCT/US12/22060, filed Jan. 20, 2012, dated May 8, 2014, 6 pgs.
Splitz, David; International Search Report and Written Opinion for Serial No. PCT/US12/22060, filed Jan. 20, 2012, dated Mar. 29, 2012, 8 pgs.
Splitz, David Edwin; Extended European Search Report for serial No. 12844451.0, filed Jan. 20, 2012, dated Apr. 21, 2015, 8 pgs.
Dukes, Brent; International Preliminary Report on Patentability for PCT application No. PCT/US15/44140, filed Aug. 7, 2015, dated Mar. 16, 2017, 12 pgs.
Dukes, Brent; International Search Report and Written Opinion for application No. PCT/US15/44140, filed Aug. 7, 2015, dated Dec. 30, 2015, 15 pgs.
Splitz, David Edwin; U.S. Provisional Patent Application entitled: Automatic Discovery of Nodes in a Mesh Network, U.S. Appl. No. 61/779,896, filed Mar. 13, 2013; 110 pgs.
Godwin, Angela; Article entitled: "Advanced Metering Infrastructure: Drivers and Benefits in the Water Industry", Waterworld, accessed on Mar. 30, 2016, 7 pgs.
ITRON; Brochure for ChoiceConnect, Copyright 2013, 4 pgs.
ITRON; Brochure for Radio Frequency Strategy in an AMI Deployment, Copyright 2012, 5 pgs.
Splitz, David Edwin; Notice of Allowance for U.S. Appl. No. 14/490,081, filed Sep. 18, 2014, dated Mar. 2, 2018, 26 pgs.
Cullinan, Thomas; Non-Final Office Action for U.S. Appl. No. 15/098,986, filed Apr. 14, 2016, dated Jan. 5, 2018, 11 pgs.
Grady, Robert Henry; Notice of Allowance for U.S. Appl. No. 15/065,423, filed Mar. 9, 2016, dated Apr. 12, 2018, 15 pgs.
Splitz, David Edwin; Office Action for Canadian patent application No. 2,850,059, filed Mar. 25, 2014, dated Apr. 23, 2018, 3 pgs.
Splitz, David Edwin; Final Office Action for U.S. Appl. No. 15/161,448, filed May 23, 2016, dated Mar. 15, 2018 ,16 pgs.
Splitz, David Edwin; Office Action for Canadian application No. 2,861,675, filed Mar. 25, 2014, dated Apr. 12, 2018, 4 pgs.
Splitz, David Edwin; Notice of Allowance for U.S. Appl. No. 15/161,448, filed May 23, 2016, dated May 23, 2018, 16 pgs.
Splitz, David Edwin; Issue Notification for U.S. Appl. No. 14/490,081, filed Sep. 19, 2014, dated Jul. 11, 2018, 1 pg.
Grady, Robert Henry; Corrected Notice of Allowance for U.S. Appl. No. 15/065,423, filed Mar. 9. 2016, dated Aug. 9, 2018, 6 pgs.
Grady, Robert Henry; Issue Notification for U.S. Appl. No. 15/065,423, filed Mar. 9, 2016, dated Aug. 21, 2018, 1 pg.
Berg et al., Spread Spectrum in Mobile Communication, 1998, The Institution of Electrical Engineers, ISBN 085296935X, pp. 42-132 (Year: 1998).
Splitz, David Edwin; Final Office Action for U.S. Appl. No. 15/206,851, filed Jul. 11, 2016, dated Jul. 20, 2018, 25 pgs.
Splitz, David Edwin; Response to Amendment under Rule 312 for U.S. Appl. No. 15/161,448, filed May 23, 2016, dated Sep. 11, 2018, 6 pgs.
Splitz, David Edwin; Corrected Notice of Allowability for U.S. Appl. No. 14/490,081, filed Sep. 18, 2014, dated Jun. 26, 2018, 8 pgs.
Cullinan, Thomas; Final Office Action for U.S. Appl. No. 15/098,986, filed Apr. 14, 2016, dated Oct. 4, 2018, 27 pgs.
Splitz, David Edwin; Corrected Notice of Allowance for U.S. Appl. No. 15/206,851, filed Jul. 11, 2016, dated Oct. 17, 2018, 13 pgs.
Splitz, David Edwin; Notice of Allowance for U.S. Appl. No. 15/206,851, filed Jul. 11, 2016, dated Sep. 20, 2018, 9 pgs.
Splitz, David Edwin; Issue Notification for U.S. Appl. No. 15/161,448, filed May 23, 2016, dated Sep. 19, 2018, 1 pg.
Magley, Dale McLeod; Non-Final Office Action for U.S. Appl. No. 15/877,548, filed Jan. 23, 2018, dated Sep. 17, 2018, 35 pgs.

* cited by examiner

HAIL AND ACCEPTANCE FOR BATTERY-POWERED DEVICES

TECHNICAL FIELD

This disclosure relates to networks. More specifically, this disclosure relates to data communications between devices in a network.

BACKGROUND

A utility provider, such as a gas, electricity, or water provider, may have a large number of control, measuring, and sensing devices installed in the field in order to control transmission and distribution of the product, measure, and record product usage, and detect problems. Such devices may include water, gas, or electrical meters, remotely controlled valves, flow nodes, leak detection devices, and the like. Utility meters may include wireless communication capability to send and receive wireless communications with a remote communication device, enabling remote reading of meters.

Advanced Metering Infrastructure (AMI), Automatic Meter Reading (AMR), and Advanced Metering Management (AMM) are systems that measure, collect, and analyze utility data using advanced metering devices such as water meters, gas meters, and electricity meters. A typical AMI network may include thousands of nodes. A "node" as used herein may refer to either a composite device in a network capable of performing a specific function or a communication module connected to such a device and configured to provide communications for the device. The AMI network also includes a device known as a repeater, which receives a signal from a central network device, such as a hub, and that regenerates the signal for distribution to other network devices. Nodes and some repeaters are powered by direct current, supplied by batteries (DC powered), while other repeaters are alternating-current (AC) powered. Because of the remote placement nature of the nodes and associated devices, it is desirable to maximize a battery life of the nodes and associated devices in order to reduce down time and to reduce the amount of maintenance that must be performed on the nodes. While the battery powering a repeater is frequently more powerful than that of a node, maximizing battery life in a DC repeater is likewise desirable.

SUMMARY

Disclosed is a method, and devices providing such a method, of performing a hail communication attempt, comprising the steps of checking capacitor voltage of a capacitor in a battery pack powering a hailing device to determine whether the capacitor voltage equals or exceeds a threshold voltage, and responsive to determining that the capacitor voltage equals or exceeds the threshold voltage, transmitting a hail message (as referred to as a "ping") to a target device, determining whether the hailing device has received a pong (response) message from the target device, and responsive to determining that the hailing device has received a pong message from the target device, terminating the hail communication attempt in preparation for sending data to the target device.

In another aspect of the current disclosure, a method of performing a hail communication attempt may further comprise the steps of, responsive to determining that the capacitor voltage does not equal or exceed the threshold voltage, implementing a sleep delay during which time the hailing device does not transmit hail messages, and determining whether a delay time-out has been reached, the delay time-out having a value that varies according to a type of capacitor used by the hailing device; responsive to determining that the delay time-out has not been reached, executing a looping routine by repeating the steps of checking the capacitor voltage, implementing the sleep delay, and determining whether the delay time-out has been reached following a repeated sleep delay; and terminating the looping routine upon one of a determination that the capacitor voltage equals or exceeds the threshold voltage and the reaching of the delay time-out.

In yet another aspect of the current disclosure, a node comprises a processor and logic processed by the processor to transmit hail messages both to a first target device configured to perform first cycles of channel activity detection (CAD) (also referred to as a "sniff"), a first sniffing interval uniformly separating each of the first cycles, and to a second target device configured to perform second cycles of CAD, a second sniffing interval uniformly separating each of the second cycles, the second sniffing interval being smaller than the first sniffing interval, and a ratio of the first sniffing interval to the second sniffing interval equaling a whole number quotient; limit a hail communication attempt according to a predetermined maximum number of groups of consecutive hail messages, each hail message in each group other than a first hail message being sent responsive to a determination that a preceding hail message was not acknowledged by the target device; separate each hail message in each group by a hail period; and separate each group by a timeslot delay.

In yet another aspect of the current disclosure, a wireless communication method, comprises the steps of listening, at a slave device and on a hailing channel during an idle state, for hail (ping) messages from a master device; receiving a hail message from the master device; sending a pong message to the master device; listening, at the slave device and on a data channel during an accepting state data receive window, for a data message from the master device; responsive to expiration of the accepting state data receive window without receipt of a data message, listening, at the slave device, during a hail receive window and on another hailing channel, for hail messages from the master device; responsive to expiration of the hail receive window without receipt of a hail message on the second hail channel, again listening on the data channel, during the accepting state data receive window, for a data message from the master device; and sequentially repeating the steps of listening for hail messages on a hailing channel, listening for data messages on a data channel, listening for hail messages on another hailing channel, and again listening for data messages on a data channel, until occurrence of an event selected from receipt of a data message and expiration of a timeout period without receipt of a data message.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
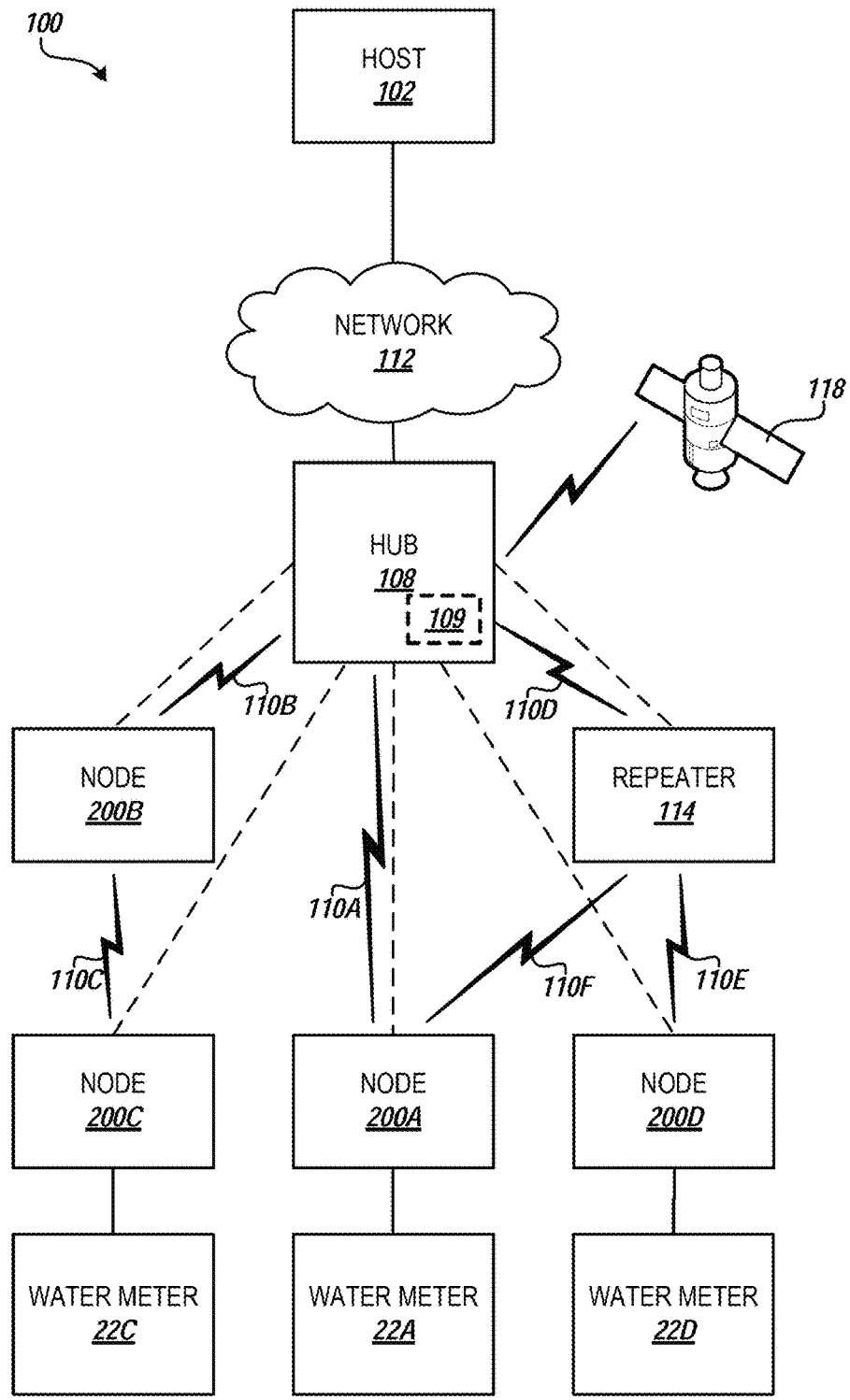
FIG. 1 is a block diagram showing one example of an AMI network topology, according to certain embodiments described herein.

The present disclosure can be understood more readily by reference to the following detailed description, examples, drawing, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

One way to maximize battery life of a node and of a DC-powered repeater is for a network device to only intermittently "listen" for a hail message from another network device. Consequently, it is desirable to maximize battery life by minimizing higher energy receive state time and maximize low energy sleep state time while maintaining reasonable responsiveness. As disclosed in U.S. patent application Ser. No. 14/741,821, now U.S. Pat. No. 10,051,346, hereby incorporated by reference in its entirety, a hail message may include several discrete elements. Such elements may include a preamble section (to be described in detail herein) and a data section comprising an identification (ID) of the "target device," i.e., a device from which a hailing device seeks to elicit a response (or, instead of a target device ID, an ID of a broadcast address, if the hail message is sent via a relevant broadcast), an ID of the hailing device, a current time, and a "start channel ID," also called a "start channel indicator" (i.e., identification of a data channel on which the hailing device will start sending other data to the target device following a successful hail). Target devices receiving a hail message will only process the hail message if the hail message is being sent as a relevant broadcast or if the target device ID in the data section of the hail message matches the ID programmed into the target device. When listening only intermittently, a device may only be fully powered on (i.e., "awake") for a small time period, such as around three milliseconds (ms) to detect whether any hail messages are being sent over hailing channels, and if not, to power off (i.e., "sleep") for a predesignated time, such as three seconds or 0.75 seconds, as two non-limiting examples. This waking-sleeping sequence alternately repeats, with the waking moments called "sniffs" and the interval between sniffs (in this example, the three seconds or the 0.75 seconds) called a "sniffing interval." If the target device detects a hail message and also detects its node ID in the hail message (or detects that the hail message is sent via a broadcast), the target device may "hop" to a data channel identified in the data section of the hail message to receive other data from the hailing device and to then send an acknowledgement (ACK) signal to the hailing device. Absent receipt of an ACK signal, the hailing device either sends another hail message or goes to sleep, depending on whether any predetermined limit on hailing attempts (such as a timeout period) has been reached.

A given AMI network may include several different kinds of devices, which can be generally categorized as either nodes or infrastructure components, the latter category including hubs and repeaters. Even within a category, devices may differ from one another, because some may be legacy devices, whiles others may be recently-installed devices that have greater capabilities than the legacy devices. The different devices may have different sniffing intervals. For example, in one implementation of the present disclosure, DC nodes may have a 3-second sniffing interval, while an infrastructure component may have a 0.75-second sniffing interval. One way to address the differences, disclosed in U.S. patent application Ser. No. 15/206,851, filed Jul. 11, 2016, which is hereby incorporated by reference in its entirety, is to configure a hailing device to use a hailing implementation specifically tailored for a given sniffing interval of a target device. As disclosed in that application, hail message preamble length and spacing between the hail messages may both differ, depending on whether the target device has a 3-second, as opposed to a 0.75-second, sniffing interval.

FIG. 1 is a block diagram showing one example of a network topology of an illustrative fixed AMI system 100, such as that implemented by a utility provider. The AMI system 100 may include utility provider systems, such as host 102. The host 102 may represent a combination of application servers, database servers, communication servers, web servers, and the like that comprise systems of, and systems used by, the utility provider to collect data from, control, and manage the various nodes 200A-200D (referred to herein generally as nodes 200) in the AMI system 100. For example, as shown in FIG. 1, nodes 200C,200A,200D may be respectively connected to water meters 22C,22A,22D and provide AMI network communication for those meters.

According to various embodiments, the host 102 may communicate with the nodes 200 through one or more collection hubs 108. In one implementation, collection hubs 108 are stationary (fixed) and may comprise specialized network nodes installed in the field that act as a "parent node" for a set of assigned child nodes 200A-200D that communicate with the hub through various communication links 110A-110F (referred to herein generally as communication links 110). The communication links 110 may include wireless communication links, such as radio frequency (RF) communication links. Owing to a stationary transceiver 109 housed in each hub 108, the communication across the communication links 110 is two-way. The collection hubs 108 may periodically collect usage data, node data, and other data from the child nodes 200 and forward data to the host 102 over a network 112. The collection hubs 108 may also forward messages received from the host 102 over the network 112 to the target child node(s) 200. The network 112 may comprise various networking technologies that connect the collection hubs 108 in the field to the host 102, including (among others) cellular data networks, Wi-Fi or WiMAX networks, satellite communication networks, metropolitan-area networks ("MANs"), wide-area networks ("WANs"), the Internet, and the like.

The collection hub 108 may communicate with its child nodes 200A-200D either directly or through one or more intermediary devices. For example, the AMI system 100 may include repeaters 114 that facilitate communication between the collection hub 108 and remote nodes, such as node 200D. According to further embodiments, some nodes may be configured to act as repeaters, referred to herein as "buddy nodes," such as node 200B shown in FIG. 1. It will be appreciated that some nodes in the AMI system 100, such as node 200A, may be located such that it receives messages from the collection hub 108 both directly and by way of one or more repeaters 114 or buddy nodes 200.

According to various embodiments, the collection hubs 108 may include or be connected to an accurate time source 118. For example, a collection hub 108 may be GPS-enabled and able to receive a highly accurate time value from a GPS receiver. Other accurate time sources 118 may include a cellular network connection, an integrated accurate real-time clock component, and the like. Because collection hubs 108 may be connected to fixed power sources, these devices may be able to maintain accurate current time without the need for reduced power consumption required by other, remote nodes 200. It will be appreciated that the configuration of the network comprising the AMI system shown in FIG. 1 and described above is merely one configuration, and additional devices and/or alternative configurations may be conceived by one skilled in the art. As such, the network topology shown in FIG. 1 and the network configurations described should not be seen as limiting but, instead, as merely exemplary.

The communication links 110 shown in FIG. 1 represent a network or networks that may comprise hardware components and computers interconnected by communications channels that enable sharing of resources and information. The network may comprise one or more of a wired, wireless, fiber optic, or remote connection via a telecommunication link, an infrared link, a radio frequency link, a cellular link, a Bluetooth® link, or any other suitable connectors or systems that provide electronic communication. The network may comprise intermediate proxies, routers, switches, load balancers, and the like. The paths followed by the network between the devices as depicted in FIG. 1 represent the logical communication links between nodes (such as 200B and 200C), between a node 200 and the hub 108, or between nodes 200 and the repeater 114, not necessarily the physical paths or links between and among the devices.

Node Configuration

Figure 2:
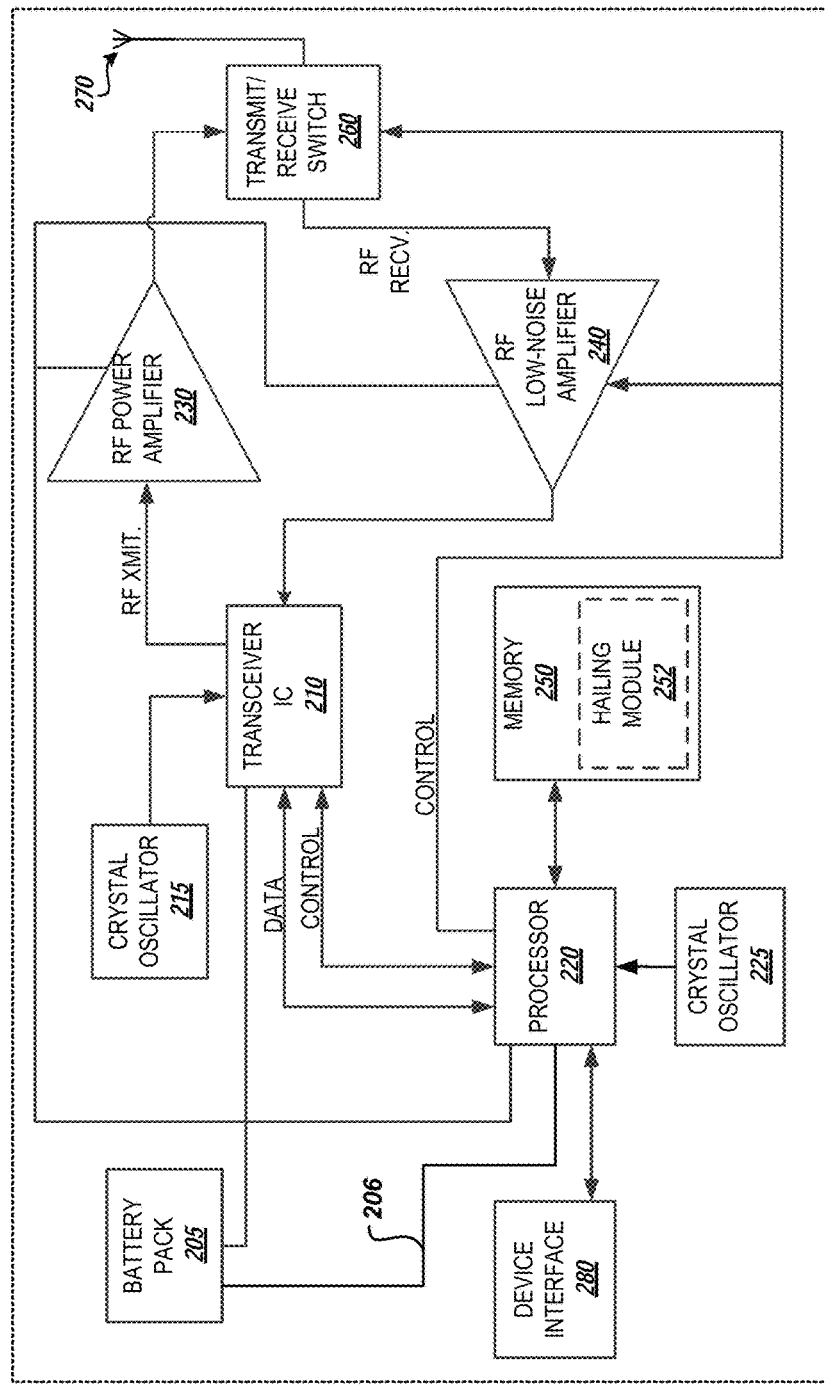
FIG. 2 is a block diagram of a node according to certain embodiments described herein.

FIG. 2 shows a block diagram of components of an illustrative node 200 configured for RF communication in AMI networks. The node 200 may allow data to and from devices in the AMI system 100, such as water, gas, or electrical meters, remotely controlled valves, flow nodes, leak detection devices, collection hubs 108, repeaters 114, and the like, to be communicated over the wireless AMI network. According to various embodiments, the node 200 may be configured for communication on various radio network topologies, including star, hybrid-star, peer-to-peer, mesh, and the like.

The node 200 may include a battery pack 205 that powers a transceiver integrated circuit ("IC") 210, a processor 220, an RF power amplifier 230, an RF low-noise amplifier 240, a memory 250, and other components. Other embodiments include nodes with fewer elements, e.g., nodes without power amplifiers or low noise amplifiers, among others. At least one electrical connector 206 directly connects the battery pack 205 to the processor 220, as will be described in greater detail with regard to FIG. 3. Crystal oscillators 215 and 225 are connected to the transceiver IC 210 and the processor 220, respectively. The node 200 further includes a transmit/receive switch 260 and antenna 270. The processor 220 may be (among others) a microprocessor, a microcontroller, a field-programmable gate array ("FPGA"), or the like. The processor 220 and the transceiver IC 210 may include both a two-way data and a two-way control line. In some embodiments, the processor 220 includes a control line to each of the RF low-noise amplifier 240 and the transmit/receive switch 260. The processor 220 may also be connected to the memory 250 by a two-way data line.

The memory 250 may comprise a processor-readable storage medium for storing processor-executable instructions, data structures and other information. The memory 250 may include a non-volatile memory, such as read-only memory ("ROM") and/or FLASH memory, and a random-access memory ("RAM"), such as dynamic random access memory ("DRAM") or synchronous dynamic random access memory ("SDRAM"). The memory 250 may store firmware that comprises commands and data necessary for the nodes 200, collection hubs 108, and repeaters 114 to communicate with other devices in the AMI system 100 as well as perform other operations of the nodes. According to some embodiments, the memory 250 may store a hailing module 252 comprising processor-executable instructions that, when executed by the processor 220, perform at least portions of the method 900 (FIG. 11), as discussed below, for controlling how a node 200 functions as a hailing device, as well as at least portion of a hail accept method 1300 (FIG. 13), as discussed below, when a node 200 is receiving a hail message.

In addition to the memory 250, the node 200 may have access to other processor-readable media storing program modules, data structures, and other data described herein for accomplishing the described functions. It will be appreciated by those skilled in the art that processor-readable media can be any available media that may be accessed by (or on board with) the processor 220 or other computing system, including processor-readable storage media and communications media. Communications media includes transitory signals. Processor-readable storage media includes volatile and nonvolatile, removable and non-removable storage media implemented in any method or technology for the non-transitory storage of information. For example, processor-readable storage media includes, but is not limited to, RAM, ROM, erasable programmable ROM ("EPROM"), electrically-erasable programmable ROM ("EEPROM"), FLASH memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage or other magnetic storage devices and the like.

According to various embodiments, the processor 220 may be further connected to other components through a device interface 280. In some embodiments, the device interface 280 may connect to a metering component, such as a water, gas, or electricity meter, that allows the meter to provide usage data to the host 102 through the AMI system 100. For example, the device interface 280 may connect to sensor or detection components inside or external to the node 200, such as the water meters 22A-22C described above. In other embodiments, the device interface 280 may connect to a control component, such as an electronically actuated water valve, that allows the host 102 and/or other devices in the AMI system 100 to control aspects of the utility provider's infrastructure. These examples are not meant to be limiting, and those of skill in the art will recognize that alternative device components that may be interfaced with the node 200 through the device interface 280. For example, the device interface 280 may connect to a control component (valve actuator) and a data reading port (water meter readings) at the same time.

It will be appreciated that the structure and/or functionality of the node 200 may be different than that illustrated in FIG. 2 and described herein. For example, at least a subset of the functionality of the transceiver integrated circuit (IC) 210, processor 220, RF power amplifier 230, RF low-noise amplifier 240, memory 250, crystal oscillators 215, 225, device interface 280 and other components and circuitry of the node 200 may be integrated within a common integrated circuit package or distributed among multiple integrated circuit packages. Similarly, the illustrated connection pathways are provided for purposes of illustration and not of limitation, and some components and/or interconnections may be omitted or simplified for purposes of clarity. It will be further appreciated that the node 200 may not include all of the components shown in FIG. 2, may include other components that are not explicitly shown in FIG. 2 or may utilize an architecture completely different than that shown in FIG. 2.

Figure 3:
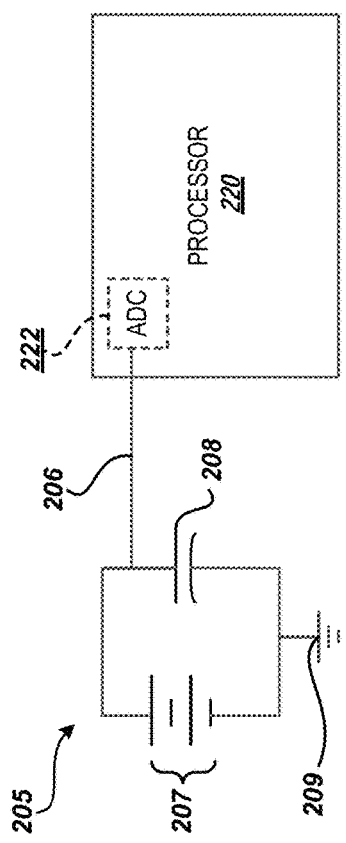
FIG. 3 is schematic diagram detailing the battery pack of FIG. 2, and its connection to an analog-to-digital converter in the processor of FIG. 2.

FIG. 3 shows, in one aspect, the connection between battery pack 205 and processor 220 in greater detail than does FIG. 2. Electrical connector 206 may be a lead, wire, a track etched into an upper surface of an integrated circuit containing the components of node 200, or any other means suitable for transmitting current between the battery pack 205 and the processor 220. In one representation, battery pack 205 comprises a battery 207 and a capacitor 208 that may be connected in parallel to the battery 207. The battery 207 and the capacitor 208 are also both connected to a ground 209, as shown. As mentioned in co-pending U.S. patent application Ser. No. 15/206,851, when a battery is coupled to a companion device, such as a particular type of capacitor charged by the battery, an AMI device can output sufficient energy for communicating. Different types of AMI devices may have different types of capacitors, such as a Hybrid Layer Capacitor (HLC) or an Electrolytic Double Layer Capacitor (EDLC), also known in the trade as a "super capacitor" which, though less expensive than an HLC, can only output sufficient energy for communicating at a fraction of the duration at which an HLC can output such energy. FIG. 3 also shows that the processor 220 includes an analog-to-digital converter (ADC) 222. The battery pack 205 is connected via electrical connector 206 to the ADC 222. If the capacitor 208 and the battery 207 are connected in parallel as shown in FIG. 3, the voltage across the battery 207 and the voltage across the capacitor 208 are equal, so a reading of the capacitor voltage by the ADC 222 equates to a reading of the battery voltage. In this manner, the ADC 222 can read the voltage across the capacitor 208 when commanded to do so by a programming instruction, and one or more non-ADC elements of the processor 220 can compare the voltage read by ADC 222 with a pre-programmed "threshold voltage," as will be described in greater detail with regard to FIG. 11. Other capacitor circuits with other elements may provide similar functionality in other embodiments and are understood to be included within the definition of the referenced capacitor 208.

Hailing Procedure and Channel Activity Detection

In some embodiments, AMI network devices such as nodes 200 (FIGS. 1 and 2) may employ frequency-hopping spread spectrum ("FHSS") technology to transmit and receive data between them. For example, as disclosed in U.S. Pat. No. 8,660,134, hereby incorporated by reference in its entirety, the nodes 200 may be configured to comply with F.C.C. rules and regulations (part 15) (47 C.F.R. § 15). FHSS is a method of transmitting and receiving radio signals by rapidly switching among many frequency channels using a pseudorandom channel sequence known to both the transmitting and receiving devices. In order to increase battery life while increasing data transmission reliability and reducing system response times, each of the nodes 200 may operate in one of at least 3 states: a SLEEP state used to conserve battery life; a SLAVE state used for responding to and receiving data from a MASTER state device; and a MASTER state used to initiate communications with (i.e., "hail") and send data to a SLAVE state device.

In the SLEEP state, a node 200 may periodically pause being idle to briefly listen for a "hailing" signal on one or more hailing channels from another device in MASTER state. Two hailing channels may be assigned to each SLEEP state device, and there would be no channel hopping in such an arrangement. In other implementations, the SLEEP state device may choose hailing channels from a predefined pseudorandom hailing channel frequency set based upon the network ID of the device (also referred to herein as "node ID"), the system time, the network ID of the assigned parent node (e.g. collection hub 108), and/or other information. If the device in SLEEP state fails to detect a hailing signal, the device returns to being idle in the SLEEP state. If the SLEEP state device detects a hailing signal, it fully awakens and begins listening for data messages from the MASTER state device on a sequence of predefined data channels selected from a predefined pseudorandom data channel frequency set as indicated by the MASTER state device. In other words, the device in SLEEP state exits the SLEEP state and enters the SLAVE state to preferably continue receiving data in a connected state.

In some embodiments, hailing channels and data channels are selected from the 902-928 MHz industrial, scientific, and medical ("ISM") bandwidth. For example, fifty (50) FHSS channels, with a minimum channel spacing of 100 kHz each, may be randomly assigned to the pseudorandom data channel frequency set. Regarding hailing channels, battery-powered (DC) nodes 200 may not be able to afford to expend the energy to continuously monitor as many as 50 FHSS channels, so a number of non-FHSS channels may be reserved for hailing of battery-powered nodes 200. For example, sixteen (16) channels may be allocated for hailing of battery-powered nodes 200. The set of sixteen (16) hailing channels may be used by nodes 200, and other network devices, during the MASTER and SLEEP states to send and receive hail messages while the set of fifty (50) data channels are used by nodes 200, and other network devices, during the MASTER and SLAVE states to send and receive data messages.

A non-limiting, exemplary set of 16 hailing channels (from hailing channel 1 to hailing channel 16) is shown below in Table 1. In some examples, the 16 non-FHSS channels may be 500 kHz wide channels. Each battery-powered node 200 may be assigned two (a set) of these non-FHSS channels to monitor for incoming hail messages. In other implementations there may only be one hailing channel and in still other implementations, there may be more than 2 hailing channels, in which case the transmission of hail messages would rotate through all hailing channels successively. In some embodiments, these hailing channels may be grouped into hailing channel groups. Referring to the example frequency set of Table 1, hailing channel group 0 may include hailing channels 1 and 2 (902.7 MHz and 903.6 MHz), while hailing channel group 1 may include hailing channels 3 and 4 (904.5 MHz and 905.4 MHz), continuing through hailing channel group 8. More generally, hailing channel group "n" may include hailing channel "x" and hailing channel "x+1" where "x" represents a hailing channel. In other embodiments, hailing channel groups may include a different number or combination of hailing channels.

TABLE 1

Hailing Channel Frequency Set

| Ch. | Freq. |
| --- | --- |
| 1 | 902.7 MHz |
| 2 | 903.6 MHz |
| 3 | 904.5 MHz |
| 4 | 905.4 MHz |
| 5 | 906.3 MHz |
| 6 | 907.2 MHz |
| 7 | 908.1 MHz |
| 8 | 909 MHz |
| 9 | 909.9 MHz |
| 10 | 910.8 MHz |
| 11 | 911.7 MHz |
| 12 | 912.6 MHz |
| 13 | 913.5 MHz |
| 14 | 914.4 MHz |
| 15 | 915.3 MHz |
| 16 | 916.2 MHz |

In still other embodiments, a set of FHSS channels could be used for hailing, whereby hailing would involve channel-hopping. In such embodiments, a particular device may select an initial subset of two (2) consecutive channels (i.e., a channel group) from a predefined pseudorandom hailing channel frequency set to be used while in the SLEEP state by first calculating a channel offset based on its node ID. This offset is added to a hailing channel pointer. The hailing channel pointer may point to one of, for example, fifty (50) available hailing channels, and may increment to the next set of two (2) channels every, for example, 18 seconds so that each device will continuously "hop" through all of the fifty (50) available hailing channels at a system hopping rate. In this manner, hailing channel usage may be spread across the predefined hailing channel. In some embodiments, the hailing channel usage may be substantially equal manner such that each channel within the hailing channel frequency set is used for substantially the same amount of time or for substantially the same number of times. In further embodiments, the hailing channel usage might be skewed to use hailing channels with less interference more frequently while using hailing channels with more interference less frequently. When sending and receiving data messages in MASTER and SLAVE states, the device may similarly hop through the data channel frequency set to assure that, on average, all data channels are used equally.

A non-limiting, exemplary set of 50 FHSS data channels (beginning with data channel 0 and continuing through data channel 49) is shown below in Table 2.

TABLE 2

Data Channel Frequency Sets

| Ch. | Freq. |
| --- | --- |
| 0 | 922.94 MHz |
| 1 | 922.1 MHz |
| 2 | 923.78 MHz |
| 3 | 922.46 MHz |
| 4 | 926.9 MHz |
| 5 | 927.26 MHz |
| 6 | 922.82 MHz |
| 7 | 923.3 MHz |
| 8 | 927.86 MHz |
| 9 | 927.5 MHz |
| 300 | 923.9 MHz |
| 11 | 926.42 MHz |
| 12 | 925.46 MHz |
| 13 | 927.38 MHz |
| 14 | 926.3 MHz |
| 15 | 925.7 MHz |
| 16 | 925.1 MHz |
| 17 | 926.18 MHz |
| 18 | 925.94 MHz |
| 19 | 924.02 MHz |
| 20 | 927.98 MHz |
| 21 | 926.66 MHz |
| 22 | 924.98 MHz |
| 23 | 927.62 MHz |
| 24 | 924.74 MHz |
| 25 | 925.22 MHz |
| 26 | 925.34 MHz |
| 27 | 924.62 MHz |
| 28 | 924.5 MHz |
| 29 | 926.54 MHz |
| 30 | 924.14 MHz |
| 31 | 923.66 MHz |
| 32 | 925.58 MHz |
| 33 | 922.22 MHz |
| 34 | 924.26 MHz |
| 35 | 927.02 MHz |
| 36 | 922.34 MHz |
| 37 | 926.06 MHz |
| 38 | 926.78 MHz |
| 39 | 923.42 MHz |
| 40 | 927.74 MHz |
| 41 | 924.86 MHz |
| 42 | 924.38 MHz |
| 43 | 922.7 MHz |
| 44 | 922.58 MHz |
| 45 | 925.82 MHz |

TABLE 2-continued

Data Channel Frequency Sets

| Ch. | Freq. |
|---|---|
| 46 | 923.54 MHz |
| 47 | 927.14 MHz |
| 48 | 923.18 MHz |
| 49 | 923.06 MHz |

Figure 4:
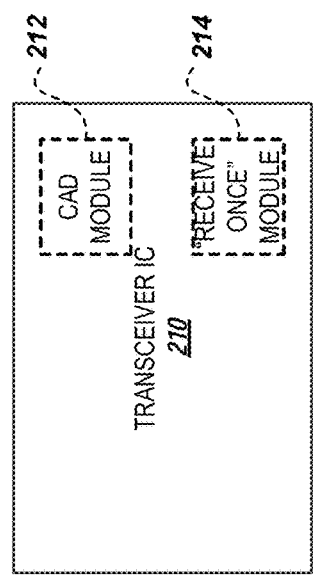
FIG. 4 is a schematic diagram isolating the transceiver of FIG. 2 for purposes of showing a channel activity detector module built into the transceiver.

A preamble may precede any valid message, including a hail message. The preamble can be detected and decoded, enabling, for example, a receiving node 200 to distinguish between a valid, intended message and other data (e.g., noise, data intended for other devices, data from another network, etc.). A preamble represents a sequence of symbols (one symbol typically comprising several data bits, communicated as a unique set of RF frequencies in a certain order for a certain period of time) that may be repeated at the start of a data message, such as a hail message. In an example, the preamble may represent a known sequence of symbols that may be six (6) symbols, although other numbers of symbols are also possible and may be utilized in various implementations. According to some embodiments, nodes 200 may perform listening cycles through a channel activity detection (CAD) process that includes listening for a hail message during a hailing listening period on the set of assigned non-FHSS channels. In certain examples, nodes 200 may utilize an RF chipset (for example, Semtech's LoRa® RF chipset for the transceiver IC 210 and other elements, as controlled by programming in memory 250), which may include an integrated or connected CAD module 212, as shown in FIG. 4. In one implementation, the CAD module 212 is a sub-function of a receiver function of the transceiver IC 210, implemented through custom firmware. CAD module 212 can quickly assess whether any RF energy exists in a hailing channel that matches a preamble transmission profile programmed into the transceiver IC 210, which in some embodiments may comprise a sequence of a single symbol being repeated.

Still referring to FIG. 4, if the CAD module 212 detects the possibility of an incoming message as a result of detecting energy in a channel that matches the preamble transmission profile, CAD module 212 can set a flag indicating the match, and the transceiver IC 210 uses a module 214 that Semtech refers to as "Receive Once" which, like the CAD module 212, is also a sub-function of the receiver function of the transceiver IC 210, and also implemented through custom firmware. The "Receive Once" module 214 looks at one symbol at a time and verifies if the RF signature matches a preamble. If such a match occurs after detection of one symbol, the "Receive Once" module 214 looks at between 3 and 10 more preamble symbols (such as five (5) more preamble symbols) for verification that the activity being detected is, in fact, a preamble. If five more preamble symbols are detected, for instance, the "Receive Once" module 214 sets a flag indicating that the data section of the hail message contains valid data, and the transceiver IC 210 enters a mode to receive that data. It may take a total of about 3 ms to perform a CAD on both of the consecutive non-FHSS channels monitored by the target device, one after the other, as a CAD can be completed upon detection of, for example, six (6) preamble symbols. Otherwise, the "Receive Once" module 214 can also set different types of flags to indicate, for instance, failure to detect five more preamble symbols, the detection of five more preamble symbols but the failure to receive data afterwards, and a cyclic redundancy check (CRC) error indicating the data was not valid. A single cycle in which a CAD is at least initiated (including completion of a CAD) may be referred to as a "CAD cycle."

Asymmetrical Hailing Method

Figure 5:
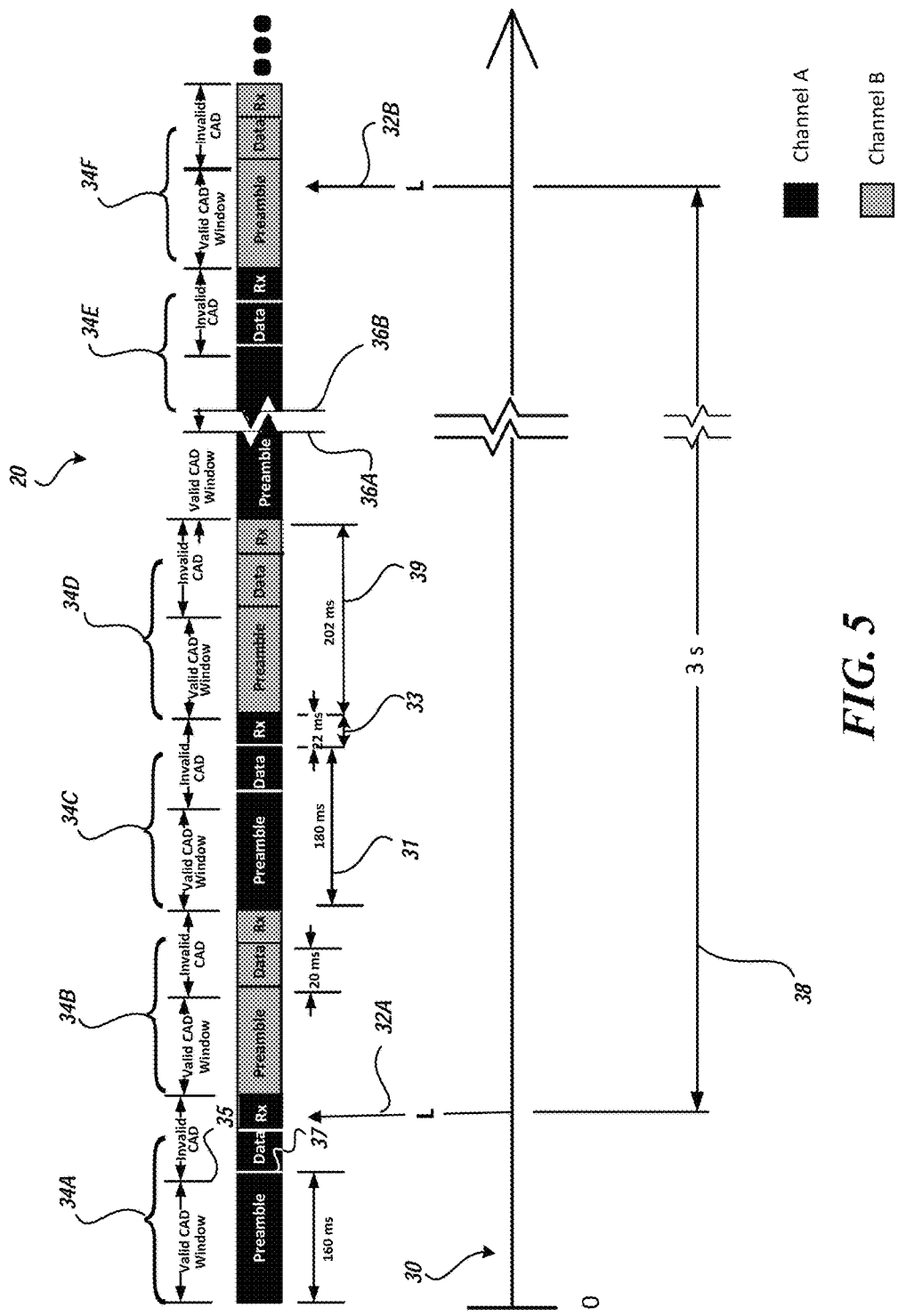
FIG. 5 is a composite timing diagram for an asymmetrical hailing method, showing example cycles of listening by a target device with a 3-second sniffing interval, and showing a hailing pattern timing diagram of hail messages being sent by a hailing device alternately between two hailing channels of the target device.
Figure 6:
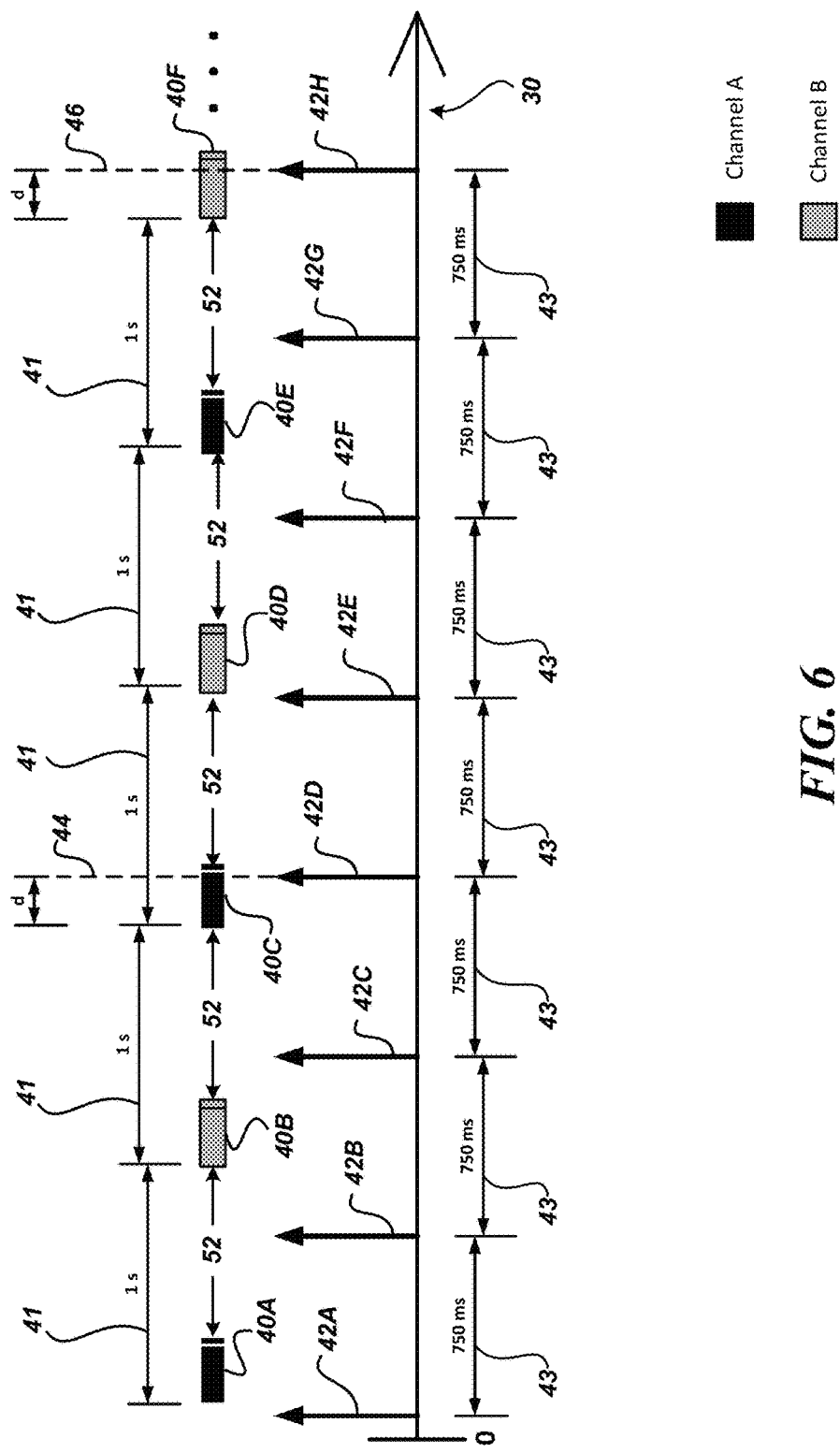
FIG. 6 is a portion of another timing diagram for an asymmetrical hailing method, showing the hailing of a device having a known 0.75-second sniffing interval.
Figure 7:
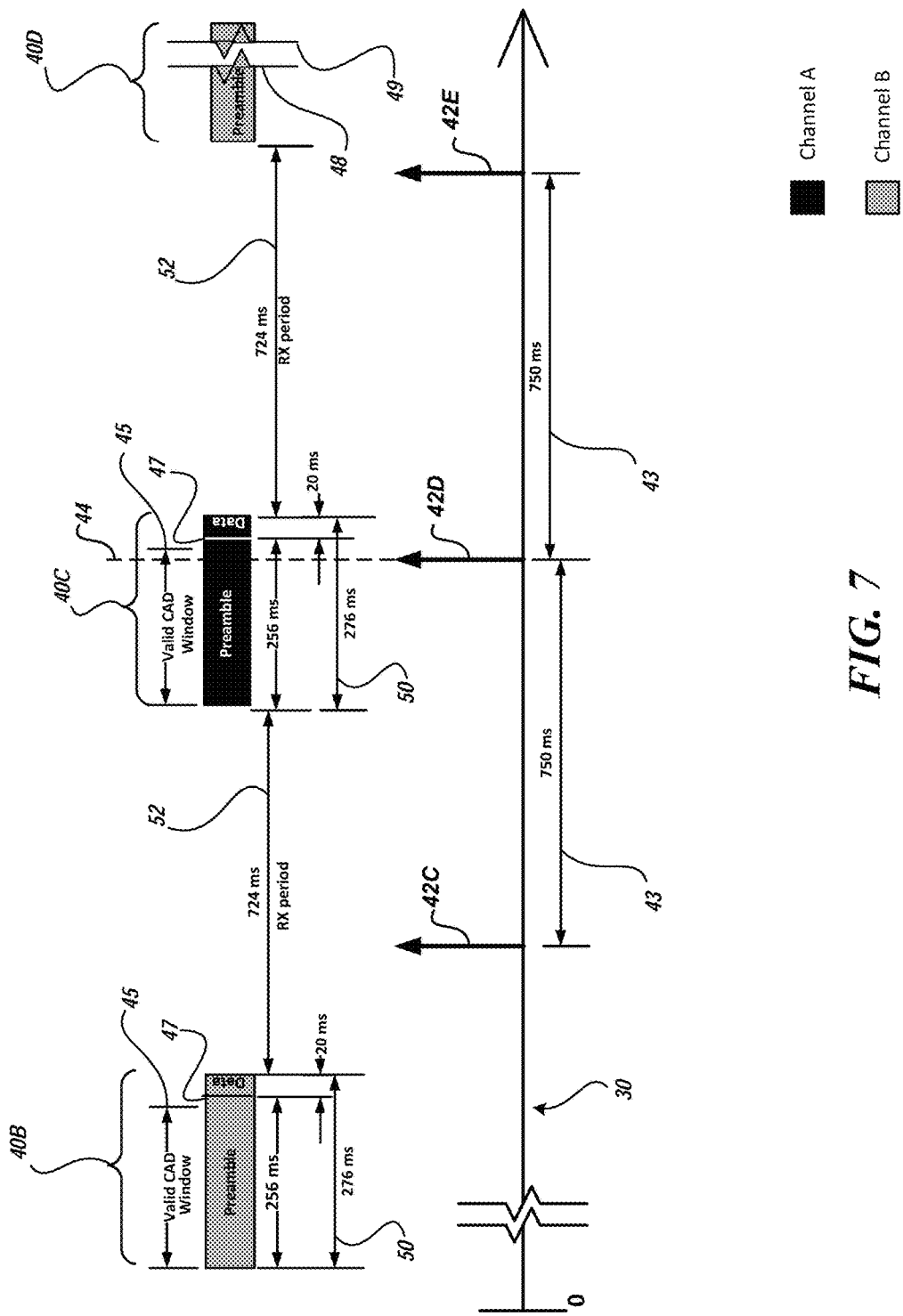
FIG. 7 is an enlargement of a portion of the timing diagram illustrated in FIG. 6, detailing dimensions of lengths of time of the hail messages as well as of the spacing between them.

FIGS. 5-7 disclose asymmetrical methods of hailing different target devices, in accordance with copending U.S. patent application Ser. No. 15/206,851, which methods provide a foundation for understanding the different, hailing method of the present disclosure, discussed with regard to FIGS. 8-11. As used in that application and herein, "asymmetrical" means that a given network device may send hail messages a rate different from that at which it receives hail messages.

As discussed above, nodes may have different sniffing intervals. FIG. 5 shows an asymmetrical method of hailing a 3-second sniffing interval target device, such as node 200 (FIG. 1). In particular, a hailing pattern timing diagram 20 represents a pattern, or sequence, of hail messages 34A-34F (collectively referred to herein as hail messages 34) from a hailing device, such as the repeater 114 (FIG. 1). A hail message is also referred to as a "ping" message, or simply as a "ping." Hailing pattern timing diagram 20 is shown in juxtaposition to timeline 30 illustrating example cycles of listening 32A,32B by node 200, the CAD cycles 32A,32B separated by a sniffing interval 38, which is three seconds in this example. Each hail message 34 may include, in some embodiments, a preamble section and a data section. Transmission of the preamble section may take, as an example, approximately 160 ms, and the data section takes, as an example, approximately 20 ms, for a hail message duration 31 of approximately 180 ms. Following transmission of each hail message 34, the hailing device (master) switches from the hailing channel, on which it transmitted the hail message 34, to the frequency-hopping, spread-spectrum (FHSS) data channel referenced as the "start channel indicator" in the data section of hail message 34. Each hail message 34 is followed by a "receive" period, labeled "RX" in the diagram, comprising as an example a duration 33 of approximately 22 ms where the hailing device tries to receive a "pong" message from the target ("slave") device on the aforementioned data channel. (A "pong" message, also referred to simply as a "pong," is a type of acknowledgement ("ACK") signal that confirms receipt of a hail message.) As shown in FIG. 5, the receiving ("RX" period) and the transmitting (Preamble and Data sections) are done on the same channel for each hail message 34. Thus, the hail messages 34 may be repeated with a period 39 of 202 ms (i.e., 180 ms+22 ms). If the start of a "pong" message is detected during the 22 ms receive period, then the hailing device waits to receive the entire "pong" message (which may be longer than 22 ms). Otherwise, without such detection, the hailing device either sends another hail or goes to sleep, depending on whether any predetermined limit on hailing attempts has been reached. FIG. 5 does not show the entirety of the preamble period of hail message 34E since break line segments 36A,36B interrupt it to indicate that more hail messages are present in the hail pattern during the 3-second sniffing interval 38 than can actually be shown in FIG. 5. In examples, such as the hailing pattern timing diagram 20 illustrated in FIG. 5, the hail messages are sent alternating between two hailing channels of the receiving node 200 (target node). As shown in FIG. 5, hail messages 34A, 34C, and 34E are sent on Channel "A," and hail messages 34B, 34D, and 34F are sent on Channel "B." In other implementations, there may only be one hailing channel and in still other implementations, there may be more than two hailing channels, in which case the transmission of hail messages 34A-34F would rotate through all hailing channels successively.

FIG. 5 indicates which portions of each hail message 34 are valid and invalid, for purposes of being able to detect a hail message 34. A target device can only detect a hail message during the period in which the preamble is being transmitted ("the preamble period") except for the last few symbols thereof, as shown in FIG. 5 (and as also discussed below with regard to FIG. 8). Detection of a hail message cannot occur when the hailing device is transmitting data or when it is waiting for the acknowledgement signal from the target device; thus, for each hail message 34, the "Invalid CAD" periods in FIG. 5 are each shown extending across an "RX" period, across a "Data" section, and extending slightly into the end of each preamble section, which is shown by dimension line segments such as at 35. Line segment 35 is intended to show that, in some implementations, a CAD cannot be completed for the last five (5) preamble symbols appearing within the 160 ms preamble period of a hail message 34, since in some embodiments detection of at least six (6) preamble symbols is required for CAD completion. A start frame 37 separates the preamble section of a hail message 34 from the data section. The start frame 37 indicates that the next matter to be transmitted is going to be data and not preamble symbols. According to embodiments, the timing of the hail messages 34 and sniffing intervals 38 is configured such that if a CAD cycle 32A,32B falls within an invalid CAD period for one hail message 34, a next CAD cycle will fall within a valid CAD period for a later hail message 34, enabling a successful hail. For example, FIG. 5 shows that initial CAD cycle 32A may fall within an invalid CAD period, such as an RX period following hail message 34A, when the hailing device awaits an acknowledgement from the target device. Three seconds later, however, the next CAD cycle 32B falls within a valid CAD window of hail message 34F.

FIGS. 6 and 7 show timing relationships associated with the asymmetrical hailing of a target device having a 0.75-second sniffing interval (such as repeater 114 of FIG. 1) by a hailing device (such as a node 200 of FIG. 1). In FIGS. 6 and 7, the hail message preamble period, and the receive periods between hail messages, differ from those discussed with regard to FIG. 5. Repeated hail messages such as 40A-40F (collectively, hail messages 40) sent from the hailing device and intended for the target device are shown appearing above CAD cycles 42A-42H (collectively, CAD cycles 42) by the target device. Consecutive CAD cycles 42 are each separated by a 0.75-second sniffing interval 43. Hail messages 40 may have a hail period 41 of about 1 second, measured between the beginnings of each consecutive hail message 40. Receive periods 52, measured after each hail message 40 is transmitted until a next hail message 40 is transmitted, can be about 724 ms in one implementation. Receive periods 52 occur where the hailing device (such as node 200) waits to detect the start of a pong message from the target device (such as the repeater 114) on a FHSS channel referenced in the hail message 40. If the start of the pong message is detected during the 724 ms period, then the hailing device waits to receive the entire pong message (which may be longer than 724 ms). Otherwise, without such detection, the hailing device either sends another hail or goes to sleep, depending on whether any predetermined limit on hailing attempts has been reached. In examples, the hail messages 40 are sent alternating between two hailing channels of the target device. As shown in FIG. 6, hail messages 40A, 40C, and 40E are sent on Channel "A," and hail messages 40B, 40D, and 40F are sent on Channel "B." In other implementations, there may only be one hailing channel and in still other implementations, there may be more than two hailing channels, in which case the transmission of hail messages 30A-40F would rotate through all hailing channels successively.

FIG. 7 is an enlargement of a portion of FIG. 6, depicting hail messages 40B,40C,40D in greater detail, though only a portion of hail message 40D is shown, as indicated by the break lines 48,49. Using hail messages 40B and 40C as examples, FIG. 7 indicates which portions of each hail message 40 are valid and invalid, for purposes of being able to perform a CAD. Line segment 45 is intended to show that, in one implementation, a CAD will not be successful for the last five (5) preamble symbols appearing within the 256 ms preamble period of a hail message 40. A start frame 47 separates the preamble portion of a hail message 40 from the data portion. Each hail message 40 may include, in one implementation, approximately 256 ms of preamble and 20 ms of data, for a hail message length of time 50 of approximately 276 ms.

In one implementation, a successful CAD is to be expected within three (3) hail attempts, and is represented in FIG. 7 by the first CAD alignment line 44 extending from the tip of CAD cycle 42D through the preamble portion of hail message 40C at a short distance behind the line segment representing the start frame 47 of hail message 40C, as shown in FIG. 5. As also shown in FIG. 6, in a worst-case scenario, such as when Channel A (the channel of hail message 40C) is not functioning properly, a successful CAD should be reached by the sixth hail message 40F (in Channel B), at the very latest. That successful CAD is represented in FIG. 6 by the second CAD alignment line 46 extending from the tip of CAD cycle 42H through the preamble portion of hail message 40F, also at a short distance behind the start frame 47 of hail message 40F. In fact, the distance "d" that the first CAD alignment line 44 is spaced from the beginning of hail message 40C, and the distance "d" that the second CAD alignment line 46 is spaced from the beginning of hail message 40F, are of identical magnitude. The CAD alignment at hail messages 40C and 40F is provided as a single example, and can similarly occur at any pair of suitably-spaced hail messages 40 among hail messages 40A-40F.

Hailing Method

Figure 8:
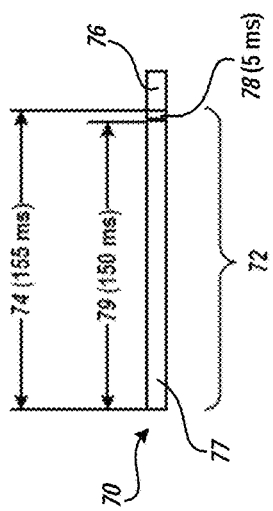
FIG. 8 is a diagram isolating an example of a single hail message sized according to an aspect of the present disclosure.

FIG. 8 isolates a single example hail message 70 configured to be transmitted in a method of performing a hail communication attempt in accordance with another aspect of the present disclosure. Hail message 70 comprises a preamble section 72 having a period 74 (for example, 155 ms) and a data portion 76. Preamble section 72 includes a valid CAD preamble portion 77 (having a period 79 of, for example, 150 ms) and an invalid CAD preamble portion 78. In this example, the invalid CAD preamble portion 78 has a period of 5 ms, which corresponds to the five final symbols of a preamble section that cannot be subject to a CAD completion, as discussed above with regard to FIGS. 5 and 7.

Figure 9:
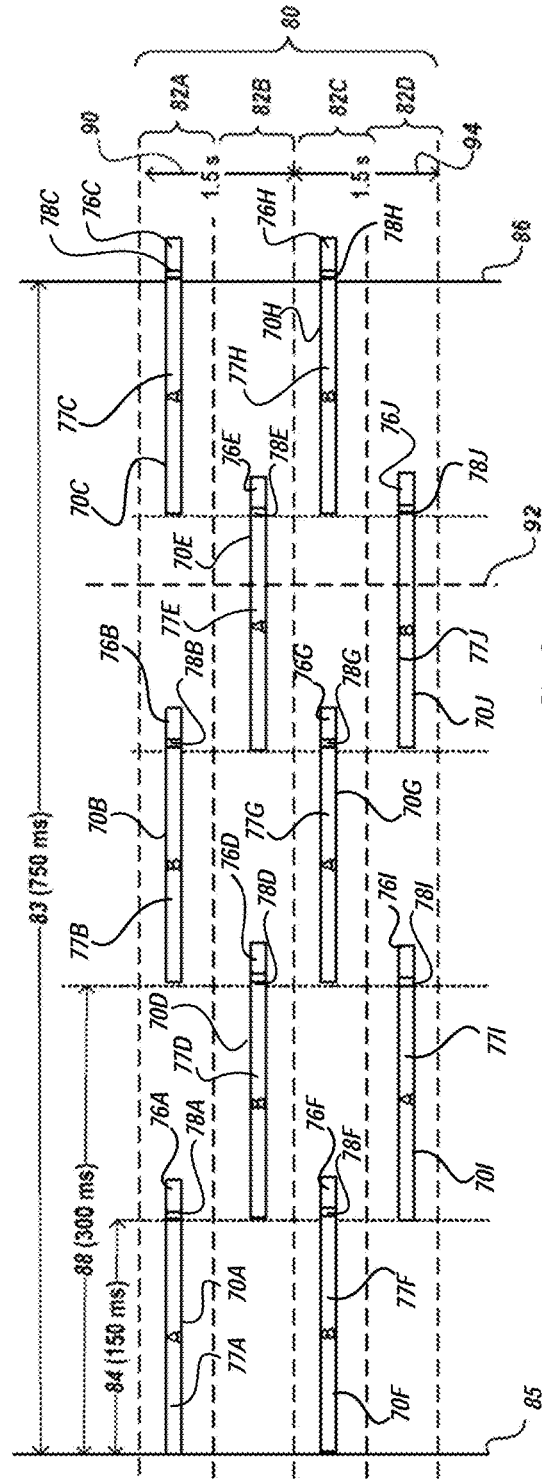
FIG. 9 is a timing diagram isolating an exemplary single group of hail messages included in a hailing method performed according to an aspect of the present disclosure.

FIG. 9 shows a hail group 80 comprising a predetermined number of consecutive hail messages 70A-70J, each configured according to FIG. 8, each thus having respective valid CAD preamble portions 77A-77J, invalid CAD preamble portions 78A-78J, and data portions 76A-76J. For ease of illustration, the hail messages 70A-70J are positioned in a stacked and staggered relationship to one another instead of serially, all in a straight line, such that the hail group 80 is segmented into four CAD windows 82A-82D (collectively "CAD windows 82"), each having a length 83, bounded by a start line 85 and an end line 86, that may be, for example, 0.75 seconds (750 ms). The sequential elapsing of all of these CAD windows 82 totals (4×0.75=) 3 seconds. End line 86 provides a boundary for CAD window length 83, even though invalid CAD portions 76C,76H and data portions 76C,76H extend beyond end line 86, because as stated above, a CAD cannot occur in portions such as 78C,78H,76C,76H, anyway. The sniffing interval of 0.75 seconds (depicted in FIGS. 6 & 7) is evenly divisible into the sniffing interval of 3 seconds (depicted in FIG. 5); in other words, the ratio of the 3-second sniffing interval to the 0.75-second sniffing interval yields a whole number quotient (i.e., 4). The 3-second duration is evenly-divided into a number of time slots 84, the number determined by dividing the total duration (here, 3 seconds) by the valid CAD preamble portion period 79 (FIG. 8, exemplified as 150 ms). In the example of FIG. 9, twenty time slots 84 result. This way, the length of each time slot 84 equals the valid CAD preamble portion period 79. Starts of each hail message 70 are separated by hail periods, as exemplified by the hail period 88 spanning the start of hail message 70A and the start of hail message 70B. In the example of FIG. 9, all hail periods 88 separating the respective starts of hail messages 70A-70J equal 0.3 seconds (300 ms) in length.

As used with respect to individual hail messages, "consecutive" means that respective starts of any two hail messages are separated in time from one another only by a hail period 88. Since the valid CAD preamble portion period 79 of each hail message 70 is 150 ms, a valid CAD preamble portion of any five channel-alternating consecutive hail messages 70A-70E, spaced as shown in FIG. 9, can randomly occur within any of the time slots 84 in CAD windows 82A,82B (those two CAD windows 82 totaling 1.5 seconds, as shown by vertical dimension line 90). Thus, a valid CAD should occur within two "sniffs" spaced by the 0.75-second sniffing interval. For example, suppose a CAD attempt, represented by the dashed vertical line 92, occurs at a time falling within the space between hail messages 70B and 70C and thus fails within the first CAD window 82A. A second CAD attempt occurs 0.75 seconds after the first CAD attempt, and thus occurs at exactly the same time within CAD window 82B as did the first attempt within CAD window 82A, which is why the dashed vertical line 92 also represents the second CAD attempt. As FIG. 9 shows, the dashed vertical line 92 passes through the valid CAD preamble portion 77E of hail message 70E, and will thus succeed, provided that hailing channel "A" is operating properly. No matter where a similar vertical line might be drawn anywhere between the start line 85 and the end line 86, such a vertical line is guaranteed to extend through a valid preamble portion of one of the hail messages 70A-70E in CAD windows 82A,82B.

Referring again to FIG. 9, the additional hail messages 70F-70J, contained within the additional CAD windows 82C,82D, add robustness to the hailing process by providing for redundancy to guard against hail channel problems that would prevent the completion of an otherwise valid CAD attempt. Demonstrating such redundancy, the dashed vertical line 92 passes through not only the valid CAD preamble portion 77E of hail message 70E (as discussed above), sent on hailing channel "A," but also through the valid CAD preamble portion 77J of hail message 70J, sent on the alternate hailing channel "B," at congruent points that are each spaced at equidistantly from the respective starts of the hail messages 70E,70J. Therefore, if a problem with Channel A were to prevent CAD completion at hail message 70E, additional hail messages 70F-70J, spaced as shown, allow a successful CAD to occur two CAD windows, or 1.5 seconds (see vertical dimension line 94) later.

Figure 10:
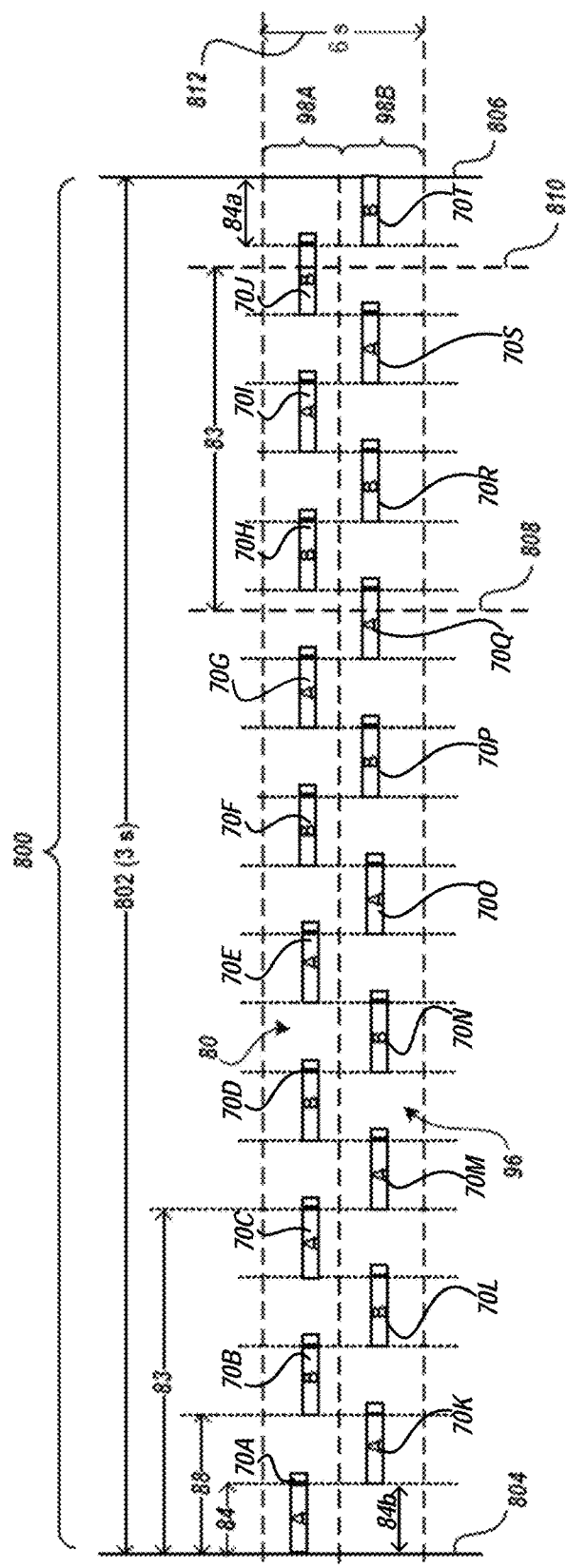
FIG. 10 is a timing diagram illustrating the sending of two groups of hail messages in a hailing method performed according to an aspect of the present disclosure, which can be used to hail a target device having either a 3-second sniffing interval, or another sniffing interval having a magnitude evenly divisible into the number 3.

FIG. 10 discloses a hail set 800, comprising the hail group 80 described above (containing hail messages 70A-70J), plus another hail group 96 (containing hail messages 70K-70T). The previously-described exemplary time slot 84, hail period 88, and 0.75-second CAD window lengths 83 are shown in juxtaposition to a 3-second CAD window length graphically represented at 802 as bounded by a start line 804 and an end line 806. Additionally, a timeslot delay, comprising timeslots 84a and 84b added together, and which thus may have a duration of 0.3 seconds, is implemented after the sending of the last hail message 70J in hail group 80. This timeslot delay creates a "timeslot slip" between consecutive hail groups that, with regard to FIG. 10 for instance, prevents hail message 70K from vertically overlapping with hail message 70A. In other words, the timeslot delay staggers a hail group (such as hail group 96) with respect to its preceding consecutive hail group (such as hail group 80). Put differently, the timeslot delay allows a hail group to occupy different segments of a CAD window length than its preceding consecutive hail group. For instance, referring to FIG. 10, in CAD window 98A, segments of CAD window length 802 are not occupied, as shown in the spaces between the hail messages of hail group 80, such as the space between hail messages 70A and 70B. However, the segments of length 802 not covered by hail group 80 in CAD window 98A are covered by hail group 96 in CAD window 98B. For example, hail message 70K covers the portion of CAD window length 802 that is not covered in CAD window 98A, i.e., the portion of the CAD window length 802 corresponding to the gap between hail messages 70A and 70B. This staggered relation caused by the timeslot delay allows a CAD cycle to occur during the transmission of a valid CAD preamble portion of a hail message, as described further below. If additional hail groups are sent, the same timeslot delay would be interposed between each hail group. With the hail messages 70A-70T spaced as shown, sending all ten hail messages 70A-70J of the hail group 80 will fill the 3-second CAD window length 802 of CAD window 98A, and sending all ten hail messages 70K-70T of the hail group 96 will fill the 3-second CAD window length 802 of CAD window 98B. With the hail message distribution of FIG. 10, a successful CAD should result within two CAD attempts ("sniffs"), regardless of whether the sniffing interval is 0.75 seconds or 3.0 seconds. For example, suppose that a first CAD attempt occurs in CAD window 98A at the time marked by dashed vertical line 808, and assume it marks a time of 1.8 seconds between it and the start line 804 (thus, 1.2 seconds from the end line 806). That first attempt would fall within the space between hail messages 70G and 70H and would thus not succeed. However, one 0.75-second CAD window length 83 later, a successful second CAD attempt occurs at dashed line 810, which passes through a valid CAD preamble portion of hail message 70J. If, instead, a 3-second sniffing intervals used, the second CAD attempt would occur 3 seconds after the CAD attempt at dashed line 808, thus 1.2 seconds to get to the end of CAD window 98A from dashed vertical line 808, then 1.8 seconds along CAD window 98B. That second CAD attempt therefore would also lie along the dashed line 808, this time passing through a valid CAD preamble portion of hail message 70Q. The same result would obtain for any other location between the start line 804 and end line 806: no matter where a vertical line is placed along length 802 between those two lines, it is guaranteed to pass through a valid CAD preamble portion of one of the hail messages within the hail set 800, regardless of whether the sniffing interval of the target device is 0.75 seconds or 3.0 seconds. Thus, the same hailing scheme can be used successfully for both types of target devices.

Figure 11:
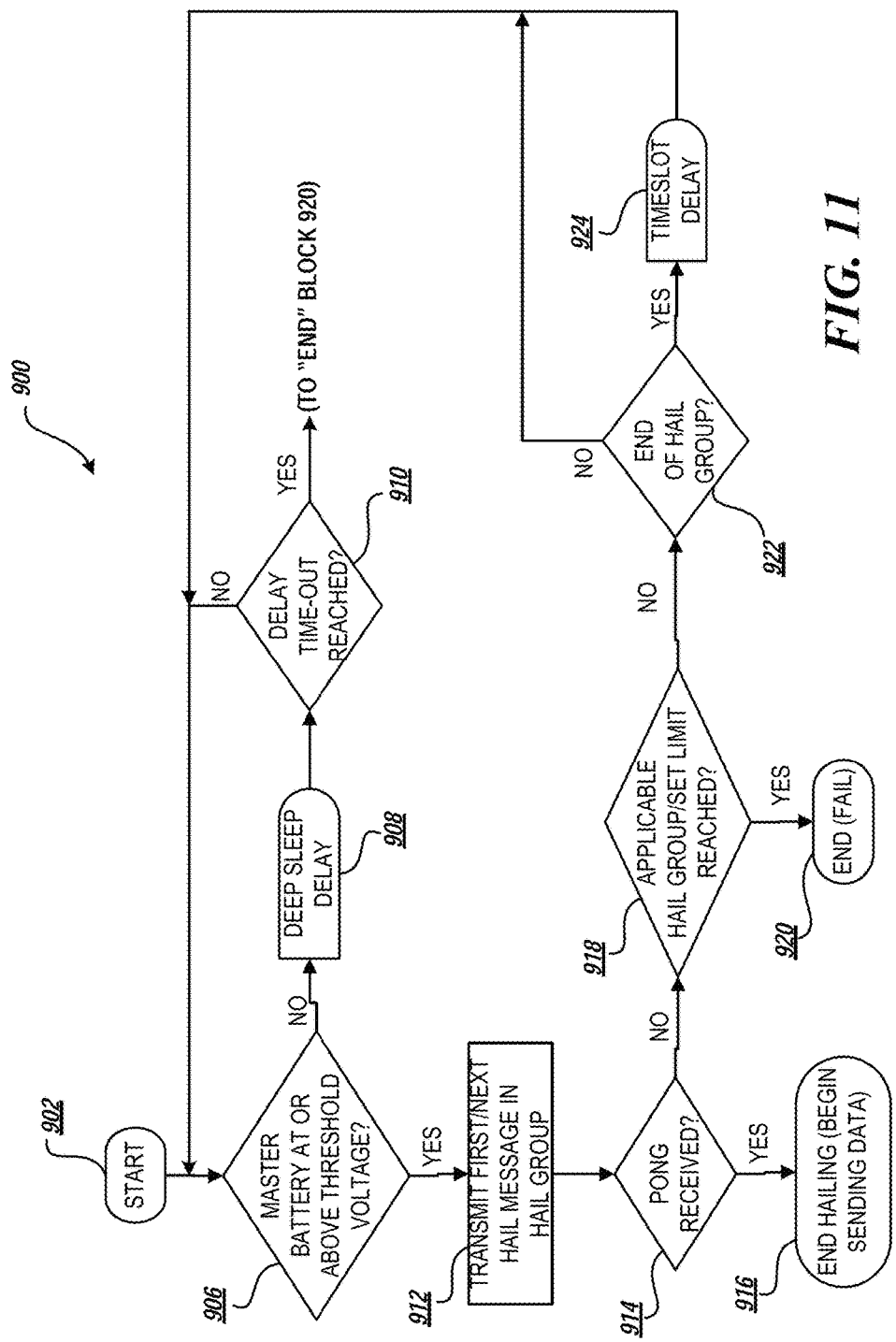
FIG. 11 is a flow diagram of an exemplary method showing steps in hailing a target device according to an aspect of the present disclosure.

FIG. 11 is a flow chart illustrating steps in a method 900 of performing a hail communication attempt in accordance with an aspect of the present disclosure. According to some embodiments, the routine 900 may be performed by the processor 220 of a node 200 when attempting to hail another node in the AMI network 100 described above. In further embodiments, the routine 900 may be performed by external processors and/or components connected to the node 200 or by some other combination of components, processors, and devices. Method 900 begins at start block 902, where a stimulus, such as the occurrence of an event or a predetermined time reached by system 100 via time source 118 (FIG. 1), prompts the hailing device to begin the process of attempting to establish a hail communication. Method 900 then advances to decision block 906, at which time the hailing device ("master") checks the voltage of its capacitor (such as capacitor 208 of FIG. 3 if the hailing device is a node 200 as in FIG. 2) to determine whether the capacitor voltage (and thus the voltage of the battery 207 connected in parallel to the capacitor 208 in FIG. 3) equals or exceeds a threshold voltage. In some embodiments, the magnitude of the threshold voltage remains the same, such as at 3.3 volts (V), regardless of hailing device configuration, though this magnitude is not to be seen as limiting. If the hailing device determines that its capacitor voltage is below its threshold voltage, method 900 branches to delay block 908, where the hailing device implements a deep sleep delay during which time the hailing device does not transmit hail messages. The deep sleep delay allows time for the battery of the hailing device to recharge its companion capacitor, with the intention of reaching sufficient voltage in the capacitor to power the sending of a hail group. In one aspect of the present disclosure, the duration of the deep sleep delay may be a multiple of the largest CAD window length of the target devices that may be hailed, such as 15 seconds, which is a multiple of the 3-second CAD window length 802 (FIG. 10).

With such a deep sleep delay duration, referring to FIG. 10, if hailing commences following the reaching of a threshold voltage (as discussed in the following paragraph), the first hail in a hail group occurs at a same timeslot 84 that it would have occupied had the deep sleep at delay block 908 not occurred. For instance, the first hail message 70K of hail group 96 occurs at a timeslot 84 just after the timeslot 84b. If instead of occurring at that timeslot in CAD window 98B, hail message 70K is sent three seconds later or some multiple thereof, hail message 70K will occupy the same timeslot 84, i.e., the second timeslot 84 along the CAD window length 802 (just after timeslot 84b). From delay block 908 (FIG. 11), method 900 proceeds to decision block 910, where it is determined whether a delay time-out has been reached. In one implementation of the present disclosure, the delay time-out duration is a multiple of the deep sleep delay, and the delay time-out duration may have a value that varies according to a type of capacitor 208 (FIG. 3) used by the hailing device. For example, if the hailing device is powered by a battery requiring the use of an EDLC ("super capacitor"), the delay time-out duration for the hailing device may be 90 seconds. For further example, if the hailing device is powered by a battery requiring the use of a particular non-EDLC capacitor, such as an HLC, the delay time-out duration for the hailing device may be only 15 seconds. If the applicable time-out delay has not yet been reached, method 900 executes a looping routine that sequentially repeats the steps of blocks 906, 908, and 910 until either the capacitor voltage equals or exceeds its threshold voltage following the last deep sleep delay, or the applicable time-out delay has been reached. If the applicable time-out delay has been reached, method 900 skips to end block 920, where method 900 ends as a failed hail communication attempt.

Referring once more to decision block 906 of FIG. 11, if it is determined that the capacitor voltage of the hailing device ("master") equals or exceeds the threshold voltage, method 900 branches to block 912, in which a hail message is transmitted to the target ("slave") device. Next, method 900 proceeds to decision block 914, where the hailing device determines whether it has received a "pong" message from the target device. If the hailing device has received a "pong" message from the target device, method 900 advances to end block 916, where the hailing device terminates the hail communication attempt in preparation for sending data to the target device on a data communication channel. If, however, at decision block 914 it is determined that the hailing device did not receive a "pong" message from the target device, method 900 advances to decision block 918, where it is determined whether a predetermined limit of consecutive hail group transmissions has been reached. Alternatively, the predetermined limit of hail transmissions may be expressed in terms of hail sets (such as hail set 800 in FIG. 10 comprising hail groups 80,96), rather than hail groups. As used with respect to hail groups, "consecutive" means that any two hail groups are separated in time from one another only by a timeslot delay such as that described above with regard to FIG. 10. Likewise, with respect to hail sets, "consecutive" means that any two hail sets are separated in time from one another only by the aforementioned timeslot delay. In one implementation of the present disclosure, a hail communication attempt may comprise a maximum of two consecutive hail sets (equaling four consecutive hail groups) when the hailing device is a battery-powered node, or a maximum of six consecutive hail sets (equaling twelve hail groups) when the hailing device is an infrastructure device, such as a hub, an AC-powered repeater, or a DC-powered repeater.

If, when decision block 918 is reached, the most recently-transmitted and unacknowledged (i.e., no "pong" received) hail message was the final hail message in the fourth group/second set (for battery-powered nodes) or in the twelfth group/sixth set (for infrastructure devices), then the predetermined limit of consecutive hail group/set transmissions has been reached, and method 900 ends at block 920 as a failed attempt. If, however, it the predetermined limit of consecutive hail group/set transmissions has not been reached, method 900 proceeds to decision block 922, where it is determined whether the most-recently transmitted (and unacknowledged) hail message was the final hail message in its hail group. If so, then method 900 advances to delay block 924, where the hailing device implements a timeslot delay, described above with regard to FIG. 10.

From delay block 924, method 900 loops back to repeat the steps beginning with decision block 906, i.e., the step of checking the capacitor voltage, so that the voltage can be checked before a first hail message in a next hail group is sent. Referring again to decision block 922, if it is determined that the most-recently (and unacknowledged) hail message was not the final message in its hail group, method 900 loops back to block 906. In other implementations, it loops back to block 912, which bypasses checking the capacitor voltage, instead simply repeating steps beginning with the step of block 912, i.e., transmitting another (a next)

hail message in the hail group to the target device, determining whether the hailing device has received a "pong" message from the target device, and either: (i) responsive to determining that the hailing device has received a "pong" message from the target device, terminating the hail communication attempt in preparation for sending data to the target device; or (ii) responsive to determining that the hailing device has not received a "pong" message from the target device, repeating the steps beginning with the step of decision block 918, i.e., determining whether the hailing device reached a predetermined limit of consecutive hail group/set transmissions.

A processor, such as processor 220 of node 200 (FIG. 2), may process logic to perform the steps heretofore described, including transmitting hail messages both to a first target device configured to perform first cycles CAD, a first sniffing interval (such as the 3 seconds discussed with regard to FIG. 5) uniformly separating each of the first cycles, and to a second target device configured to perform second cycles of CAD, a second sniffing interval (such as the 0.75 seconds discussed with regard to FIG. 6) uniformly separating each of the second cycles, the second sniffing interval being smaller than the first sniffing interval, and a ratio of the first sniffing interval to the second sniffing interval equaling a whole number quotient (exactly 4, using the above examples). The logic processed can also limit a hail communication attempt according to a predetermined maximum number of groups of consecutive hail messages, each hail message in each group other than a first hail message being sent responsive to a determination that a preceding hail message was not acknowledged by the target device, separating each hail message in each group by a hail period, and separating each group by a timeslot delay.

Various modifications are contemplated as being within the scope of the present disclosure. For instance, the hailing method performed according to any aspect of the present disclosure need not be limited in its versatility to just two different target device sniffing intervals. The range of compatible target devices for the disclosed method may include a third target device in which a third sniffing interval (for example, 1.5 seconds) uniformly separates CAD cycles, the third sniffing interval being smaller than the first sniffing interval and different from the second sniffing interval, and a ratio of the first sniffing interval to the third sniffing interval equaling another whole number quotient (exactly 2, in this example). Alternatively, the third sniffing interval could be a multiple of the first sniffing interval (such as 6 seconds) and also maintain compatibility with the disclosed hailing method. Additional target devices would also be compatible with the disclosed hailing method, so long as the sniffing intervals of each such additional target devices bear either the whole number quotient relationship, or the multiple relationship, to the sniffing interval of the first device.

Hail Accept Method

Figure 12:
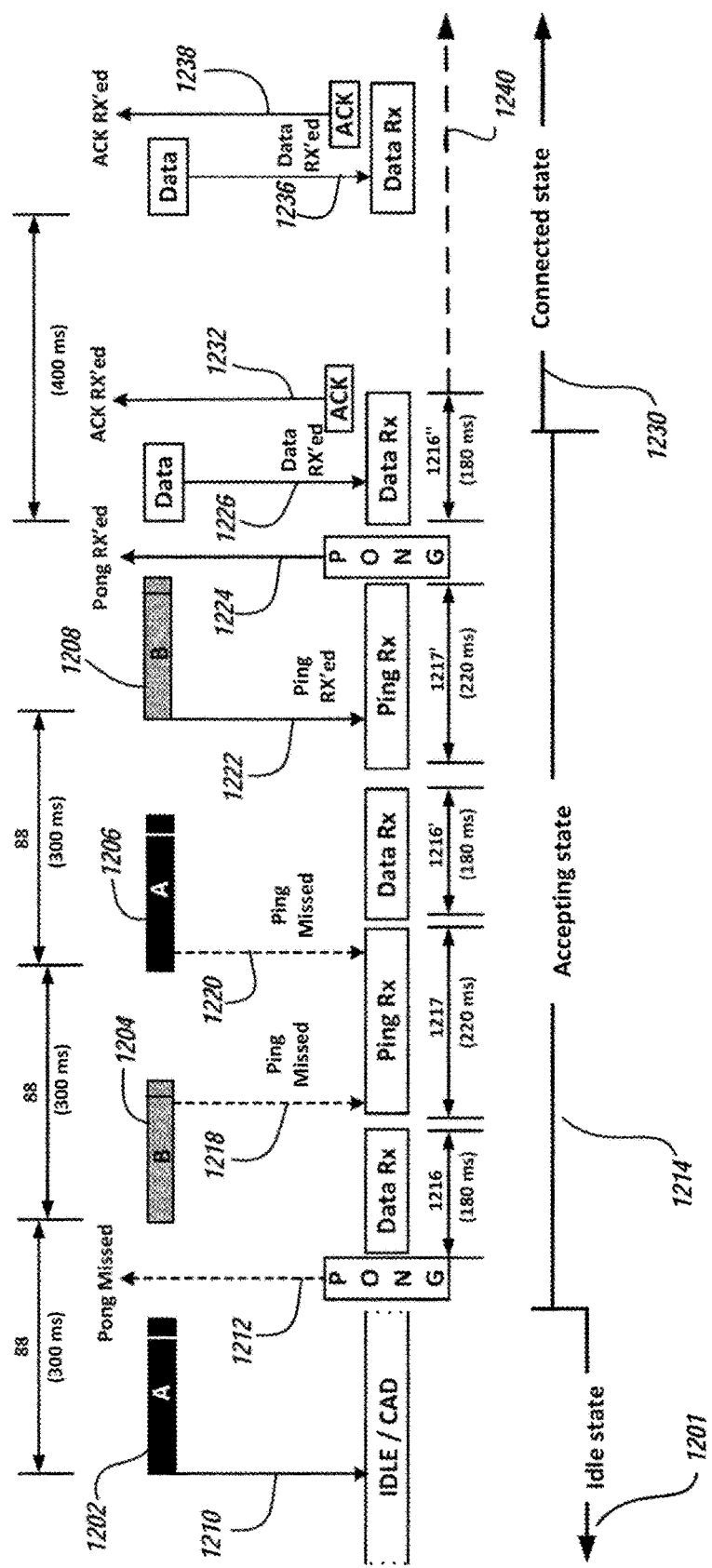
FIG. 12 is a timing diagram illustrating how a hail accept method performed according to an aspect of the present disclosure can overcome data connection problems between master and slave devices following the sending of a "pong" message.
Figure 13:
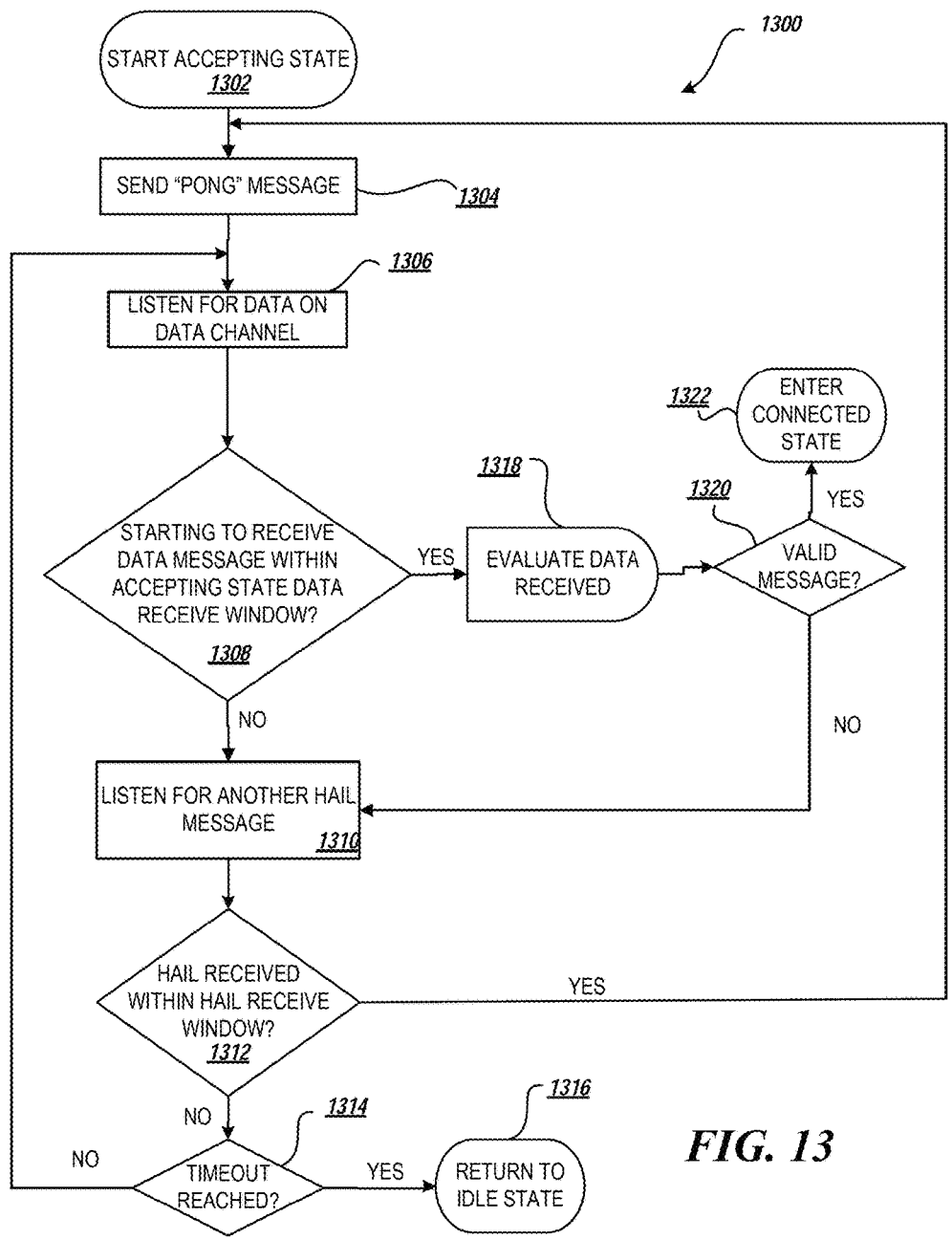
FIG. 13 is a flow diagram of an exemplary hail accept method performed according to an aspect of the present disclosure.

FIGS. 12 and 13 illustrate examples of hail accept methods, which address connection problems that can still arise after the sending of a "pong" message. Existing wireless systems can have problems establishing a data connection between a "master" device and a "slave" device, even after the slave device confirms receipt of a hail message by sending a "pong" message to the master device. After the "pong" message is sent, at least two problems can still arise that result in miscommunication between the master device and the slave device. In a first scenario, the master fails to receive the "pong" message and thus continues to send more hail messages instead of switching to a data channel to send data to the slave device. In a second scenario, the master device did receive the "pong" message from the slave device, but following transmission of data to the slave device, the master device did not receive an expected ACK signal from the slave device acknowledging receipt of the data.

FIG. 12 is a timing diagram illustrating an example of hail message and data message sequencing that eventually leads to a successful data connection between a master ("hailing") device and a slave ("target") device. Consecutive hail ("ping") messages 1202, 1204, 1206, and 1208 are sent by a master device, or hailing device, one example of which is the repeater 114 of FIG. 1. Hail messages 1202-1208 may have a hail period 88 of about 300 ms (same as 88 in FIG. 9), though other suitable durations for hail period 88 may be implemented. A slave device, one example of which is node 200A (FIG. 1), in an idle ("sleep") state 1201 listens for a hail message by performing a CAD of hail message 1202, in the manner discussed above with regard to FIG. 4, the CAD and proper receipt of the hail message represented by a solid arrow 1210 in FIG. 12. The slave sends a "pong" signal, represented by dotted arrow 1212, to the master device to confirm receipt of hail message 1202, but the master device happens to miss the pong signal in this example, which can happen for one of a number of reasons, such as interference.

The slave device enters an accepting state 1214, as further described below, alternating between listening for data on a data channel and listening for hail messages on multiple hailing channels. The slave device first listens for a data message from the master device, on a data channel specified in hail message 1202, during an accepting state data receive window 1216 (which may be 180 ms long, though other suitable durations may be implemented). However, in the example depicted in FIG. 12, the accepting state data receive window 1216 expires without any data being received because none was sent from the master device in this example because the master device did not receive the pong signal 1212. Instead, during that accepting state data receive window 1216, the first portion of a hail ("ping") message 1204 was being missed because the slave device was looking for data, not a ping message. Responsive to expiration of the accepting state data receive window 1216 without reception of a data message, the slave device alternates from listening to the data channel to again listen for a hail signal during a hail receive window 1217 (220 ms in this example, though other suitable durations may be implemented). However, in the example of FIG. 12, hail receive window 1217 either begins too late or also happens to suffer from external interference circumstances preventing it from receiving hail message 1204 from the master device, as represented by dotted arrow 1218. Likewise, for interference reasons, as an example, hail message 1206 is also missed, as represented by dotted arrow 1220. Responsive to expiration of hail receive window 1217, the slave device again alternates to a data channel to listen, during accepting state data receive window 1216' (again, 180 ms in this example) for data messages from the master device. However, FIG. 12 shows that during the accepting state data receive window 1216', only the hail message 1206 was sent, not a data message, so the accepting state data receive window 1216' also expires. Until the receipt of a data message or the expiration of a timeout period, the slave device repeats the steps of alternatively listening for hail messages on the hailing channels and listening for data messages on the data channel.

In the example situation exemplified in FIG. 12, responsive to the expiration of the accepting state data receive window 1216' without reception of a data message, the slave device alternates back to listen for a hail message during hail receive window 1217'. This time, the slave device receives hail message 1208 through the CAD process (shown by solid arrow 1222). The slave device then sends another pong message, represented by solid arrow 1224, to the master device (though the illustrated relative length of the pong message, like the illustrated gaps in time between hail receive windows and data receive windows, are simply shown for illustrative purposes), and then listens for data on the instructed data channel during another accepting state data receive window 1216". Subsequently, the master device receives the pong message (shown at solid arrow 1224) and in response, sends a data message, which is shown by solid arrow 1226 as having been received by the slave device during data receive window 1216". For a brief time, the slave device then performs an evaluation to determine whether the data message received at solid arrow 1226 is valid. If the slave device determines that the data message received at solid arrow 1226 is valid, then the slave device typically acknowledges receipt of a valid data message, as shown by solid arrow 1232 representing an ACK message to the master device that is received by the master, and the master device and slave device have entered a connected state 1230, i.e., the slave device has transitioned from the accepting state 1214 to a slave connected state. The slave device will then continue to look for data messages, in one example, every 400 ms, hopping to the next data channel and repeating until either the slave devices receives additional data or times out, after which it would return to the accepting state 1214 or, in other implementations, an idle state. If the master device does not receive an expected ACK message, it will continue to send data every 400 ms, in this implementation, until it gets an expected ACK message or times out. FIG. 12 also shows the slave device receiving another data message at solid arrow 1236 and responding with another ACK message shown by solid arrow 1238. The steps of hopping to another data channel and listening for an ensuing data message are repeated until the process ends as instructed or times out.

FIG. 13 is a flow diagram of an exemplary hail accept method 1300 performed according to one aspect of the present disclosure. Method 1300 starts at block 1302, when the hail accepting state initiates, i.e., after the first receipt of a valid hail message, thereby ending an idle state. A "pong" message is sent at block 1304, and at block 1306, the slave device listens to a data channel for a data message. At decision block 1308, if the slave device starts to receive data within an accepting state data receive window (such as at 1216, 1216', or 1216" in FIG. 12), method 1300 branches to block 1318; otherwise, method 1300 advances to block 1310, where the slave device alternates to again listen to the hailing channels for another hail message during a hail receive window (such as at 1217, or 1217' in FIG. 12). If the slave device listens for another hail message, method 1300 advances from block 1310 to decision block 1312, where it is determined whether a hail message was received within the hail receive window. If the slave device received a hail message within the hail receive window, method 1300 loops back to just before block 1304, when a pong message is sent (such as at 1224 in FIG. 12). If no hail message was received within the hail receive window, then method 1300 advances to decision block 1314, where it is determined whether a predetermined timeout period has been reached. If no timeout period has been reached, method 1300 loops back to a point just before block 1306, where the slave device alternates to listen to a data channel to listen for a data message. In one implementation, the data channel is the same as was previously monitored, while other implementations include following a sequence of frequency hopping data channels as discussed above. Still other implementations vary depending on instructions in the hail message. If, on the other hand, a timeout period has been reached, method 1300 advances from decision block 1314 to end block 1316, where the slave device returns to an idle state.

Still referring to FIG. 13, if the method 1300 branched to block 1318 from decision block 1308, a slight delay occurs so that the slave device can evaluate the data it started to receive at block 1308. Upon completion of that evaluation, method 1300 advances to decision block 1320, where the slave device determines whether, on the basis of that evaluation, the data it received was in fact valid. If so, method 1300 advances to end block 1322, where the slave device and the master device enter a connected state, such as the state previously described with regard to FIG. 12 at 1230. If, on the other hand, the slave device determines that the data evaluated is not valid, then method 1300 branches to block 1310 (previously described), in which the slave device hops on a hail channel to receive another hail message.

The above description is provided as an enabling teaching in its best, currently known embodiments. To this end, those skilled in the relevant art will recognize and appreciate that many changes can be made to the various disclosed aspects described herein, while still obtaining the beneficial results of the present disclosure. It will also be apparent that some of the desired benefits can be obtained by selecting some of the features without utilizing or including other features. Accordingly, those who work in the art will recognize that many modifications and adaptations are possible and can even be desirable in certain circumstances and are a part of the present disclosure. Thus, the above description is provided as illustrative of the principles of the present disclosure and not in limitation thereof. In addition, as used throughout, the singular forms "a," "an" and "the" include plural referents unless the context clearly dictates otherwise. Thus, for example, reference to "a panel" can include two or more such panels unless the context indicates otherwise. Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. For purposes of the current disclosure, a material property or dimension measuring about X on a particular measurement scale measures within a range between X plus and industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances. As used herein, the terms "optional" or "optionally" mean that the subsequently described event or circumstance may or may not occur, and that the description comprises instances where said event or circumstance occurs and instances where it does not. It is further understood that the disclosure is not limited to the specific embodiments disclosed hereinabove, and that many modifications and other embodiments are intended to be included within the scope of the appended claims. Moreover, although specific terms are employed herein, as well as in the claims which follow, they are used only in a generic and That which is claimed is:

1. A method of performing a hail communication attempt, comprising the steps of:
 checking capacitor voltage across a capacitor in a battery pack powering a hailing device to determine whether the capacitor voltage equals or exceeds a threshold voltage; and
 responsive to determining that the capacitor voltage equals or exceeds the threshold voltage
  transmitting a hail message to a target device,
  determining whether the hailing device has received a pong message from the target device, and
  responsive to determining that the hailing device has received a pong message from the target device, terminating the hail communication attempt in preparation for sending data to the target device.

2. The method of claim 1, wherein the hail message comprises a valid preamble portion having a length of 150 milliseconds.

3. The method of claim 1, further comprising the steps of, responsive to determining that the capacitor voltage does not equal or exceed the threshold voltage:
 implementing a sleep delay during which time the hailing device does not transmit hail messages, and
 determining whether a delay time-out has been reached, the delay time-out having a value that varies according to a type of capacitor used by the hailing device.

4. The method of claim 3, further comprising the steps of, responsive to determining that the delay time-out has not been reached:
 executing a looping routine by repeating the steps of checking the capacitor voltage, implementing the sleep delay, and determining whether the delay time-out has been reached following a repeated sleep delay, and
 terminating the looping routine upon one of a determination that the capacitor voltage equals or exceeds the threshold voltage and reaching the delay time-out.

5. The method of claim 1, further comprising the steps of, responsive to determining that the hailing device did not receive a pong message from the target device:
 determining whether the hailing device reached a predetermined limit of consecutive hail group transmissions, each hail group comprising a predetermined number of consecutive hail messages that alternate between a first hailing channel and a second hailing channel; and
 responsive to determining that the hailing device did not reach the predetermined limit of consecutive hail group transmissions
  determining whether a most-recently transmitted hail message was a final hail message in the hail group, and
  responsive to determining that the most-recently transmitted hail message was the final hail message in the hail group, implementing a timeslot delay, and repeating the steps beginning with the step of checking the capacitor voltage.

6. The method of claim 5, further comprising the step of, responsive to determining that the hailing device reached the predetermined limit of consecutive hail group transmissions, terminating the hail communication attempt.

7. The method of claim 5, wherein the predetermined limit of consecutive hail group transmissions is four consecutive hail groups for hailing devices that are battery-powered nodes, and twelve consecutive hail groups for hailing devices that are infrastructure components.

8. The method of claim 5, wherein the timeslot delay has a duration of 0.3 seconds.

9. The method of claim 5, wherein each hail group comprises ten hail messages, starts of each hail message separated from one another by a hail period.

10. The method of claim 9, wherein the hail period has a length of 0.3 seconds.

11. The method of claim 5, further comprising the steps of, responsive to determining that the most-recently transmitted hail message was not the final hail message in its hail group:
 transmitting another hail message in the group to the target device,
 determining whether the hailing device has received a pong message from the target device, and
 responsive to determining that the hailing device has received a pong message from the target device, terminating the hail communication attempt in preparation for sending data to the target device.

12. The method of claim 11, further comprising, responsive to determining that the hailing device has not received a pong message from the target device, repeating steps beginning with the step of determining whether the hailing device reached a predetermined limit of consecutive hail group transmissions.

13. A node, comprising:
 a processor; and
 logic processed by the processor to
  transmit hail messages both to a first target device configured to perform first cycles of channel activity detection (CAD), a first sniffing interval uniformly separating each of the first cycles, and to a second target device configured to perform second cycles of CAD, a second sniffing interval uniformly separating each of the second cycles, the second sniffing interval being smaller than the first sniffing interval, and a ratio of the first sniffing interval to the second sniffing interval equaling a whole number quotient,
  limit a hail communication attempt according to a predetermined maximum number of groups of consecutive hail messages, each hail message in each group other than a first hail message being sent responsive to a determination that a preceding hail message was not acknowledged by the target device,
  separate each hail message in each group by a hail period, and
  separate each group by a timeslot delay.

14. The node of claim 13, wherein the logic is further processed by the processor to set the predetermined maximum number of groups of consecutive hail messages to four groups.

15. The node of claim 13, wherein the logic is further processed by the processor to transmit hail messages to a third target device configured to perform third cycles of CAD, a third sniffing interval uniformly separating each of the third cycles, the third sniffing interval being smaller than the first sniffing interval and different from the second sniffing interval, and a ratio of the first sniffing interval to the third sniffing interval equaling another whole number quotient.

16. The node of claim 13, wherein the logic is further processed by the processor to transmit hail messages to a third target device configured to perform third cycles of CAD, a third sniffing interval uniformly separating each of the third cycles, the third sniffing interval being a multiple of the first sniffing interval.

17. The node of claim 13, wherein the logic is further processed by the processor to:
   check capacitor voltage of a capacitor in a battery pack powering the node to determine whether the capacitor voltage equals or exceeds a threshold voltage; and
   responsive to determining that the capacitor voltage equals or exceeds the threshold voltage, transmitting a first hail message in a hail group to the target device.

18. The node of claim 17, wherein the logic is further processed by the processor to bypass a checking of the capacitor voltage, and to send another hail message, responsive to a determination that a preceding hail message was both unacknowledged and not a final hail message in the hail group.

19. The node of claim 17, wherein the logic is further processed by the processor to, responsive to determining that the capacitor voltage does not equal or exceed the threshold voltage
   implement a sleep delay during which time the node does not transmit hail messages, and
   determine whether a delay time-out has been reached, the delay time-out having a value that varies according to a type of capacitor used by the node.

20. The node of claim 19, wherein the logic is further processed by the processor to, responsive to determining that the delay time-out has not been reached
   execute a looping routine by repeating steps of checking of the capacitor voltage, implementing the sleep delay, and determining whether the delay time-out has been reached following a repeated sleep delay, and
   terminate the looping routine upon one of a determination that the capacitor voltage equals or exceeds the threshold voltage and reaching the delay time-out.

21. A wireless communication method, comprising the steps of:
   listening, at a slave device and on a hailing channel during an idle state, for hail messages from a master device;
   receiving a hail message from the master device;
   sending a pong message to the master device;
   listening, at the slave device and on a data channel during an accepting state data receive window, for a data message from the master device;
   responsive to expiration of the accepting state data receive window without receipt of a data message, listening, at the slave device, during a hail receive window and on another hailing channel, for hail messages from the master device;
   responsive to expiration of the hail receive window without receipt of a hail message on the another hail channel, again listening on the data channel, during the accepting state data receive window, for a data message from the master device; and
   sequentially repeating the steps of listening for hail messages on a hailing channel, listening for data messages on the data channel, listening for hail messages on another hailing channel, and again listening for data messages on the data channel, until occurrence of an event selected from receipt of a data message and expiration of a timeout period without receipt of a data message.

22. The method of claim 21, wherein the step of listening for hail messages on a hailing channel comprises performing channel activity detection of two non-frequency-hopping spread spectrum hail channels, one channel after the other, within 3 milliseconds.

23. The method of claim 21, further comprising the steps of, responsive to receiving a first data message from the master device:
   determining whether the first data message is valid; and
   responsive to determining that the data message is valid, entering a connected state with the master device, whereby the slave device listens on the data channel for a second data message from the master device, the listening for the second data message occurring during a connected state data receive window.

24. The method of claim 23, further comprising the step of, responsive to receiving the second data message within the connected state data receive window, listening for a next data message from the master device.

25. The method of claim 24, further comprising the steps of:
   receiving the next data message from the master device;
   listening during the connected state data receive window, and on the data channel, for an ensuing data message from the master device; and
   repeating the steps of receiving the next data message and listening for an ensuing data message until expiration of the connected state data receive window without receipt of an ensuing data message.

26. The method of claim 23, further comprising the steps of, responsive to a failure to receive the second data message within the connected state data receive window:
   hopping to another data channel;
   listening for the second data message on the another data channel during the connected state data receive window.

27. The method of claim 26, further comprising repeating the steps of hopping to another data channel and listening for the second data message until occurrence of an event selected from receipt of the second data message and expiration of a timeout period without receipt of the second data message.

* * * * *